(12) United States Patent
Oohira et al.

(10) Patent No.: US 12,198,825 B2
(45) Date of Patent: Jan. 14, 2025

(54) CHEMICAL DECONTAMINATION METHOD

(71) Applicant: Hitachi-GE Nuclear Energy, Ltd., Ibaraki (JP)

(72) Inventors: Takashi Oohira, Hitachi (JP); Shintaro Yanagisawa, Hitachi (JP); Satoshi Oouchi, Hitachi (JP); Nobuyuki Ota, Hitachi (JP); Ryo Hamada, Tokyo (JP); Hideyuki Hosokawa, Tokyo (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 782 days.

(21) Appl. No.: 17/479,126

(22) Filed: Sep. 20, 2021

(65) Prior Publication Data
US 2022/0102019 A1 Mar. 31, 2022

(30) Foreign Application Priority Data

Sep. 30, 2020 (JP) ............................. JP2020-164910

(51) Int. Cl.
*G21F 9/28* (2006.01)
(52) U.S. Cl.
CPC ...................... *G21F 9/28* (2013.01)
(58) Field of Classification Search
CPC ........................................................ G21F 9/28
USPC ............................................................ 588/1
See application file for complete search history.

(56) References Cited

U.S. PATENT DOCUMENTS

2014/0037037 A1 2/2014 Ito et al.

FOREIGN PATENT DOCUMENTS

| CN | 111333225 A | * | 6/2020 | |
|---|---|---|---|---|
| IT | 1171051 B | * | 6/1987 | ............. G21C 15/18 |
| JP | H11-109094 A | | 4/1999 | |
| JP | 2001-235594 A | | 8/2001 | |
| JP | 2004-205302 A | | 7/2004 | |
| JP | 2005-164344 A | | 6/2005 | |
| JP | 2011-064481 A | | 3/2011 | |
| JP | 2014-044190 A | | 3/2014 | |
| JP | 6470467 B1 | | 2/2019 | |
| JP | 6505810 B1 | | 4/2019 | |

OTHER PUBLICATIONS

Notice of Reasons for Refusal, mailed Apr. 11, 2023, for Japanese Patent Application No. 2020-164910 (with English translation).

* cited by examiner

*Primary Examiner* — Edward M Johnson
(74) *Attorney, Agent, or Firm* — BAKER BOTTS L.L.P.

(57) ABSTRACT

A chemical decontamination method capable of improving the decontamination efficiency of chemical decontamination of a steam dryer in the RPV is provided. In particular, the decontamination method includes feeding a chemical decontamination aqueous solution into a reactor pressure vessel in which a steam dryer is arranged, and after chemical decontamination of the steam dryer, the water level of the chemical decontamination aqueous solution existing in the reactor pressure vessel is lowered to a first water level below the lower end of the steam dryer.

14 Claims, 13 Drawing Sheets

[FIG. 1]
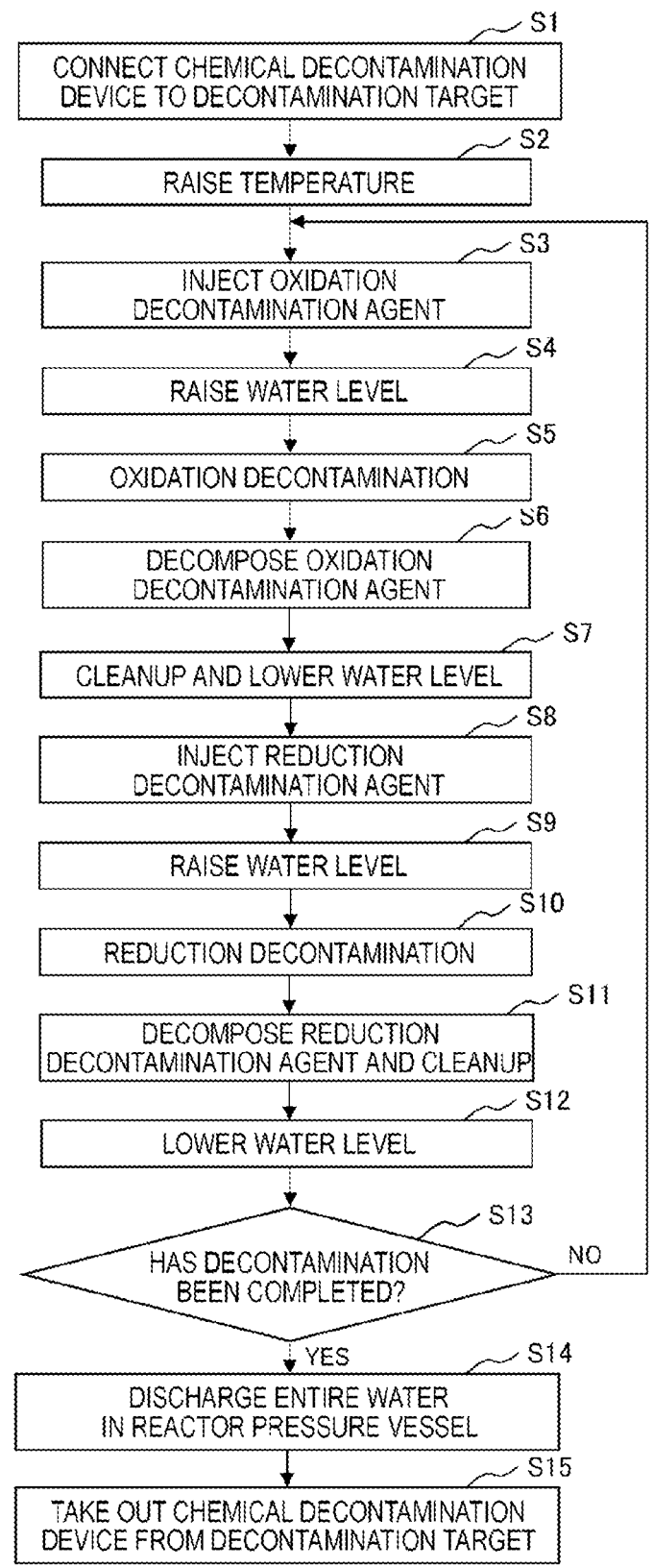

[FIG. 2]
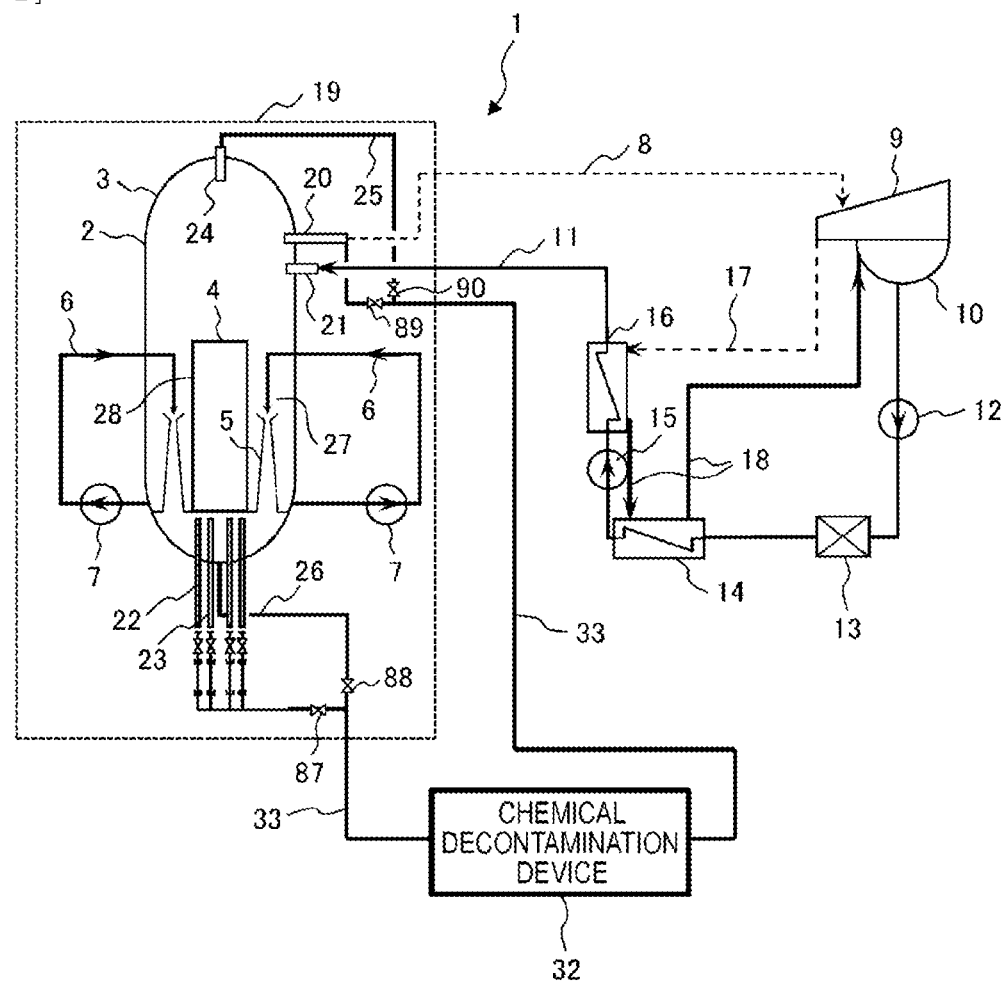

[FIG. 3]
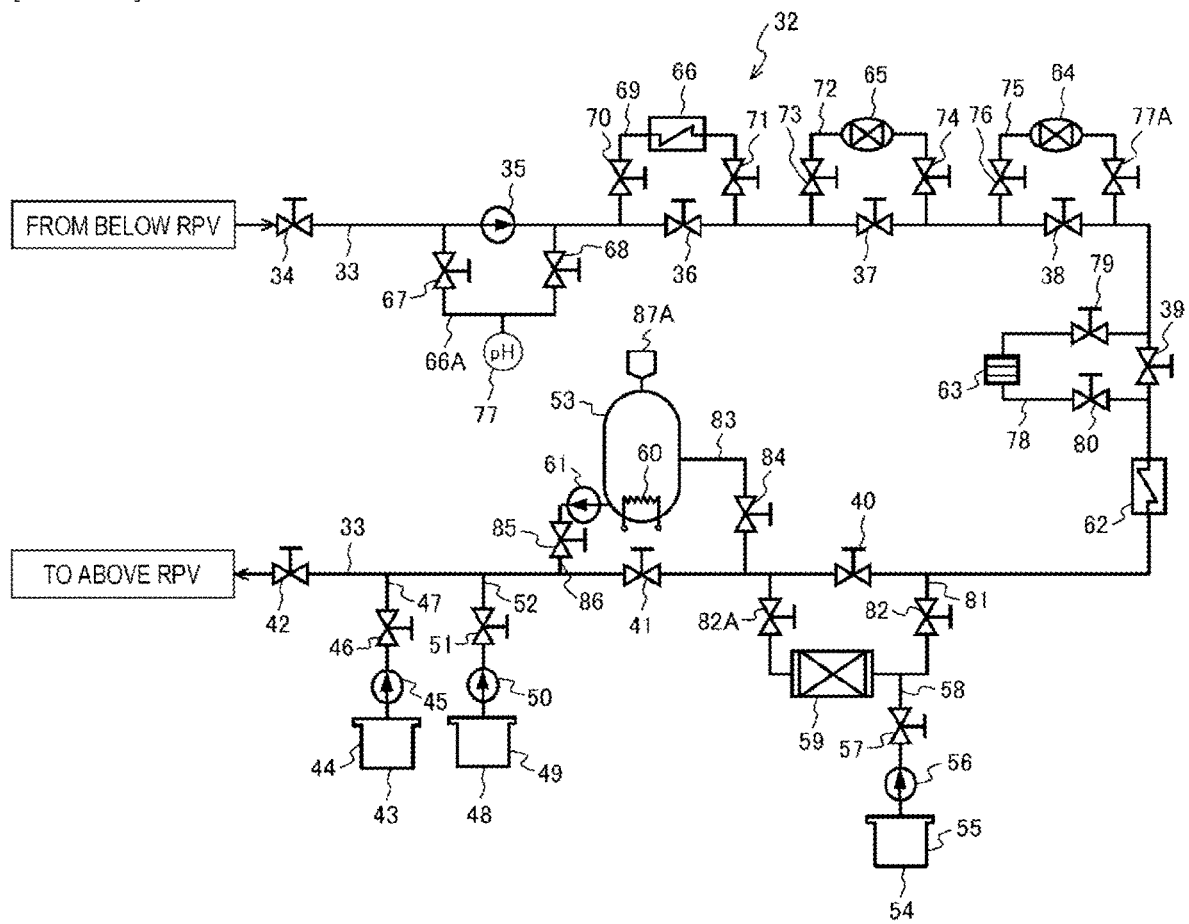

[FIG. 4]
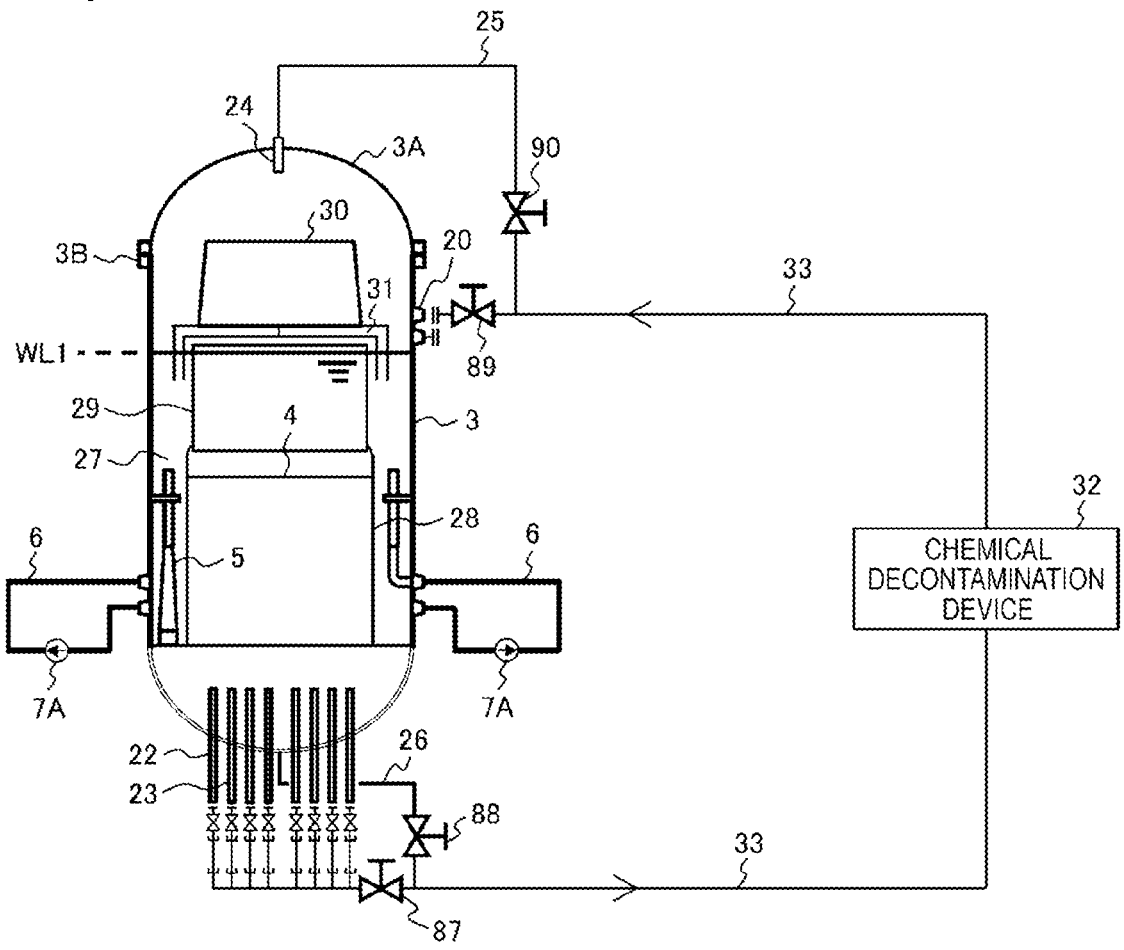
[FIG. 5]
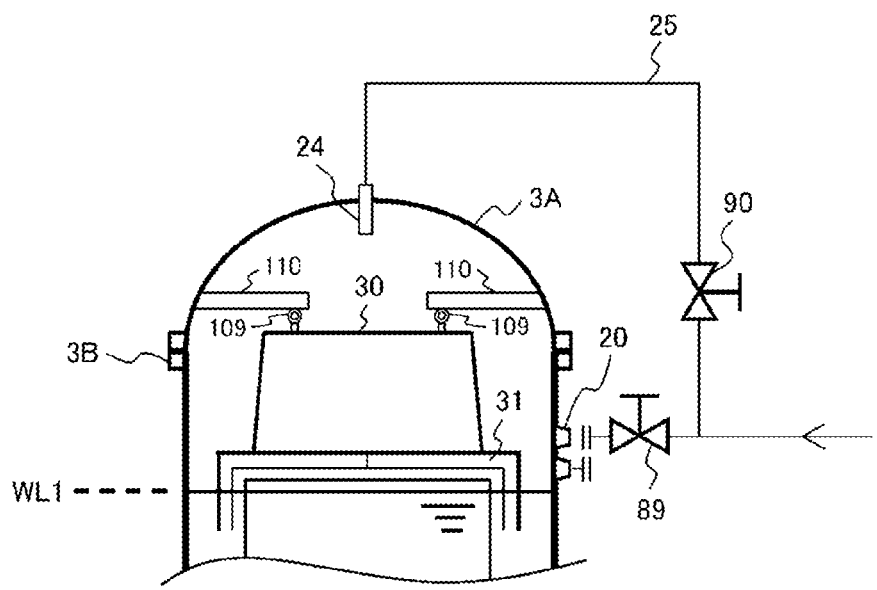

[FIG. 6]
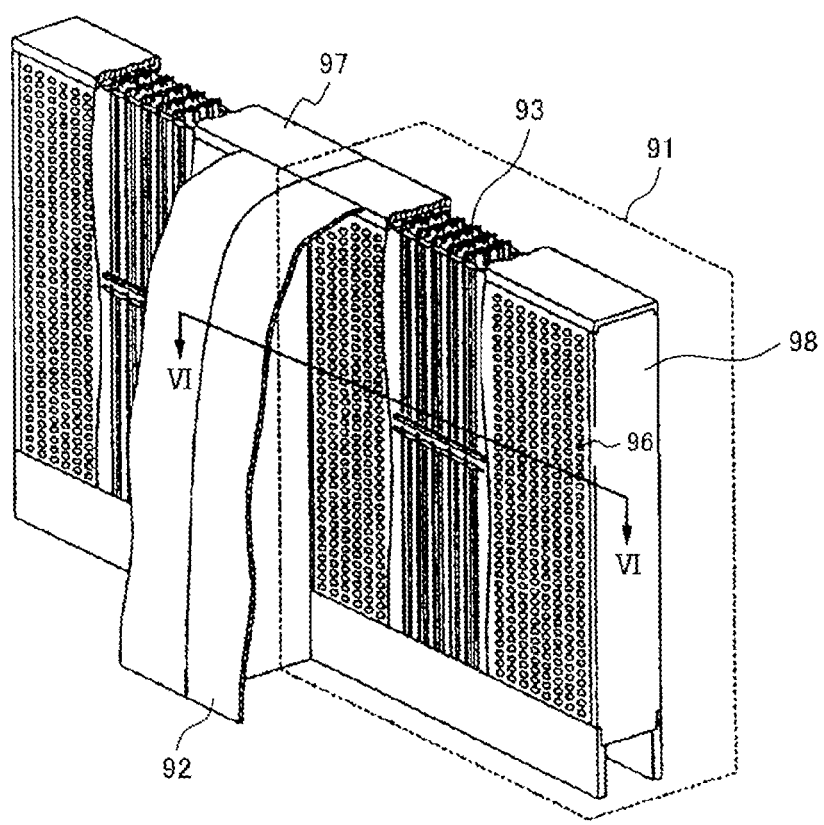

[FIG. 7]
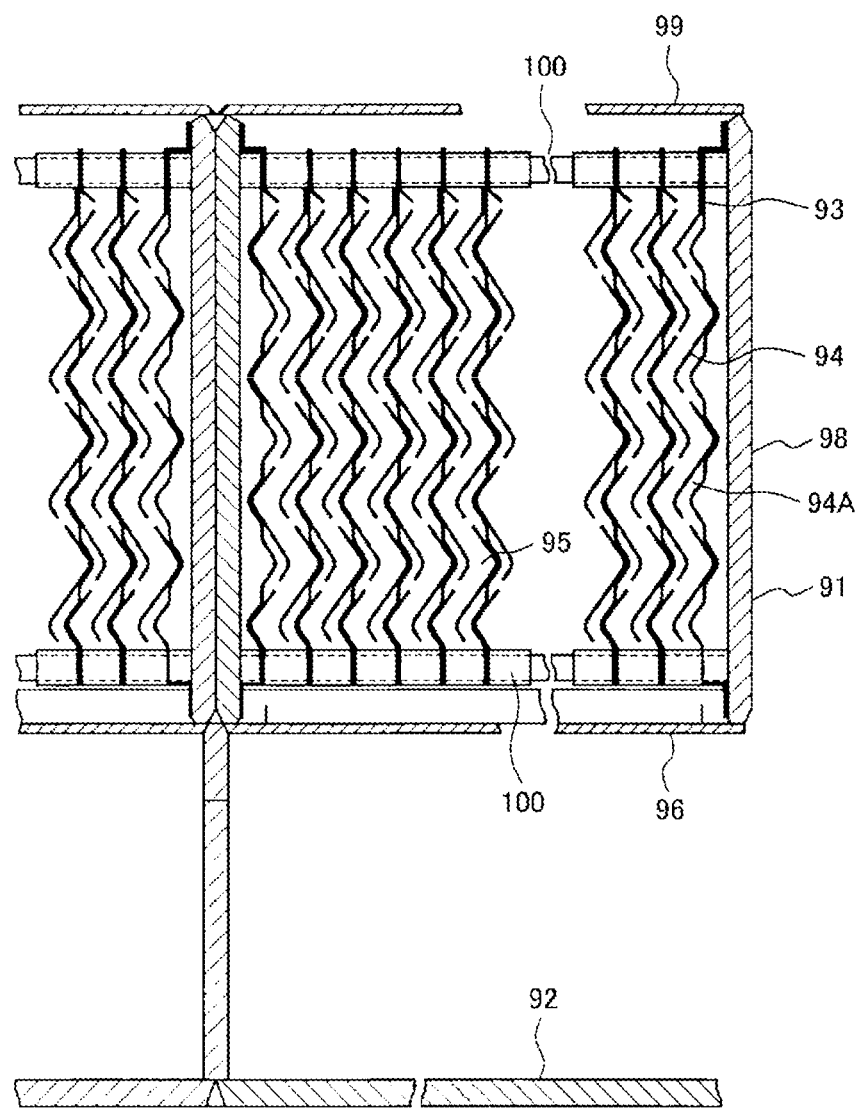

[FIG. 8]
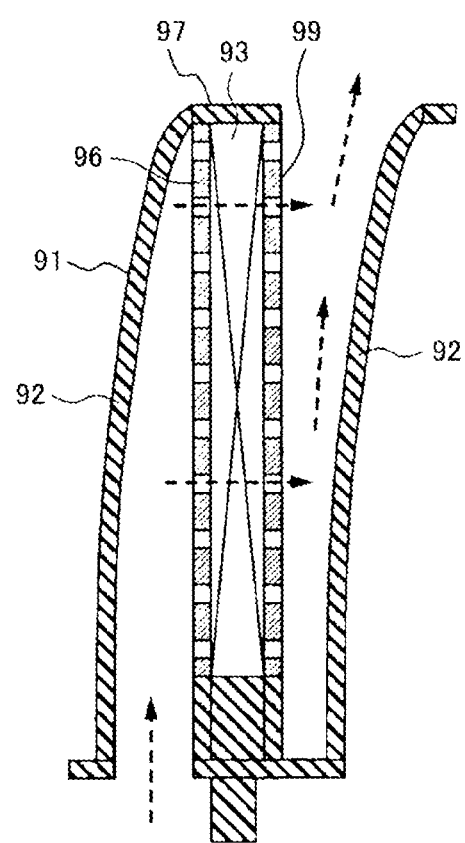

[FIG. 9]
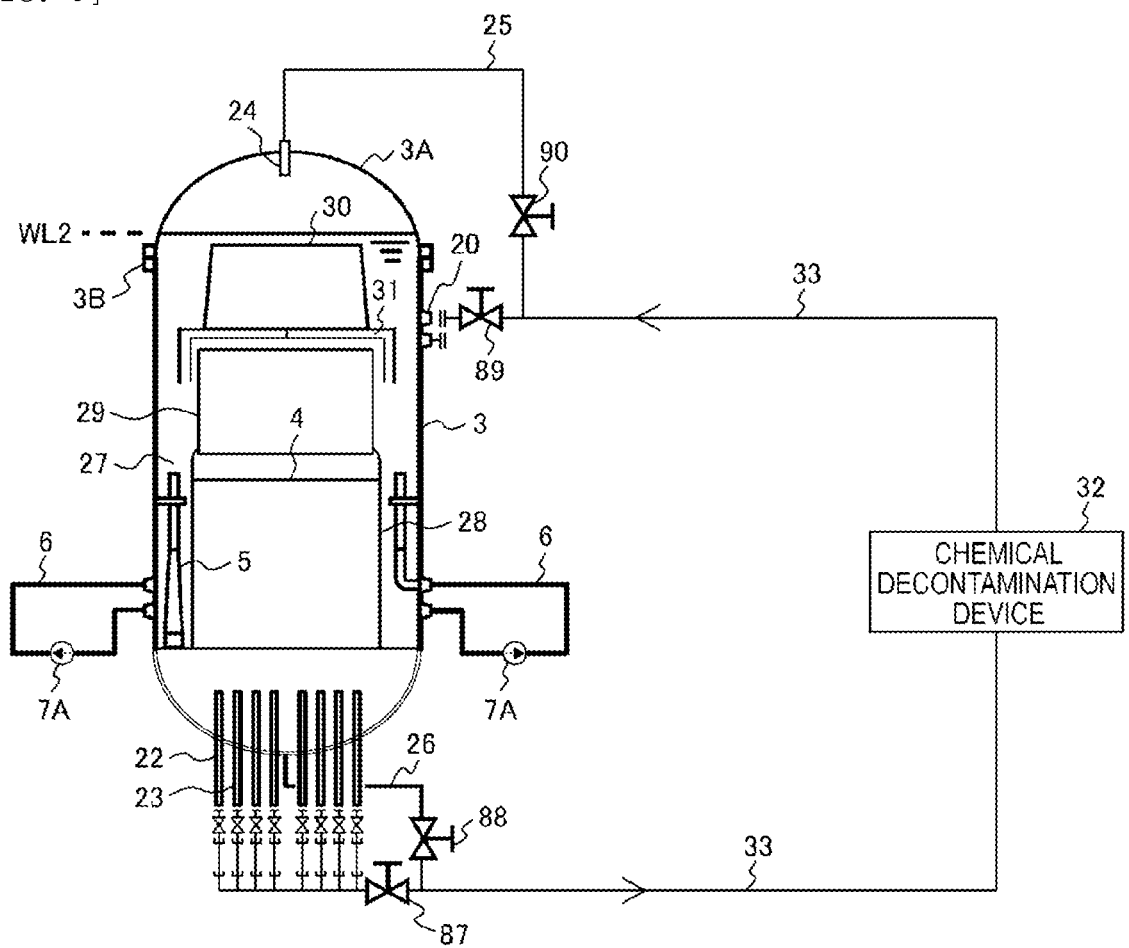

[FIG. 10]
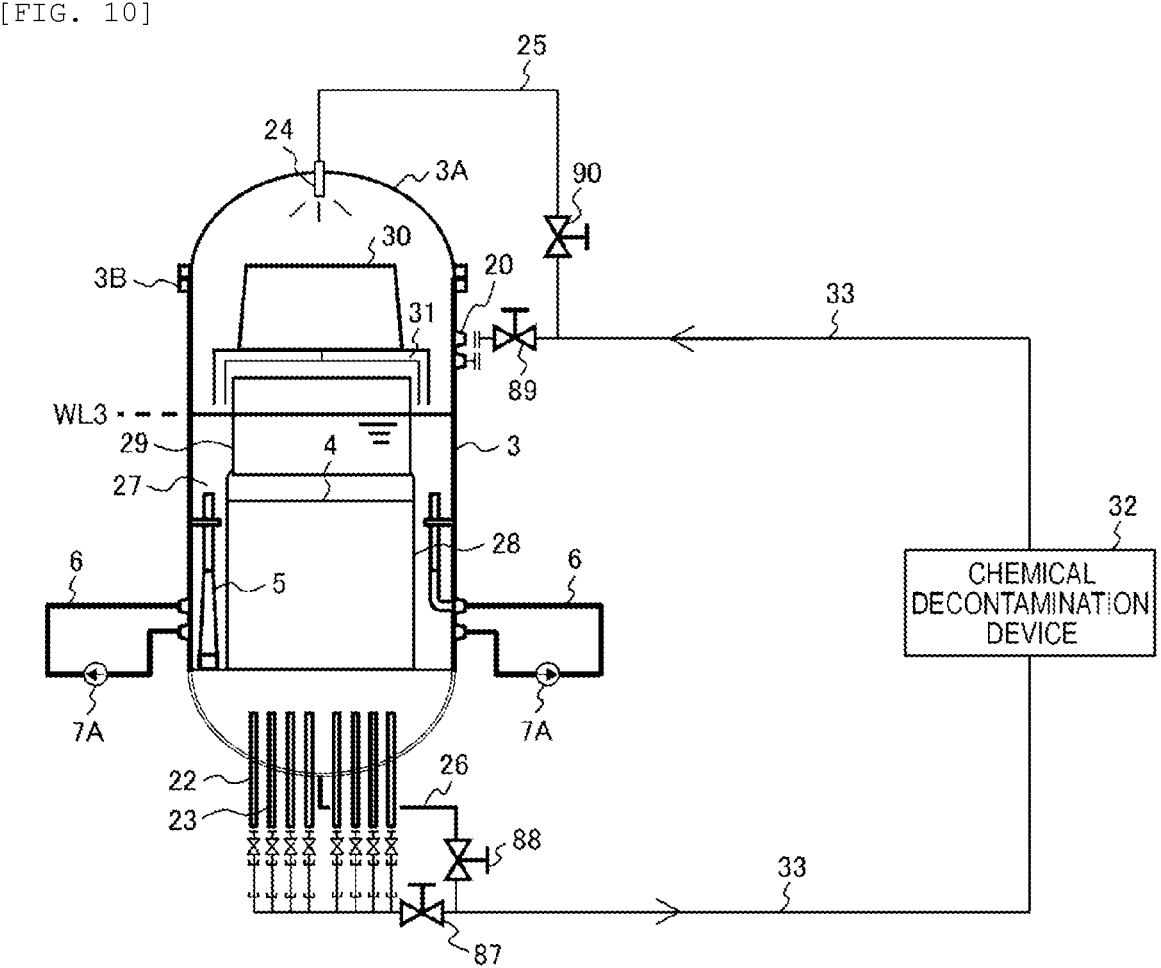

[FIG. 11]
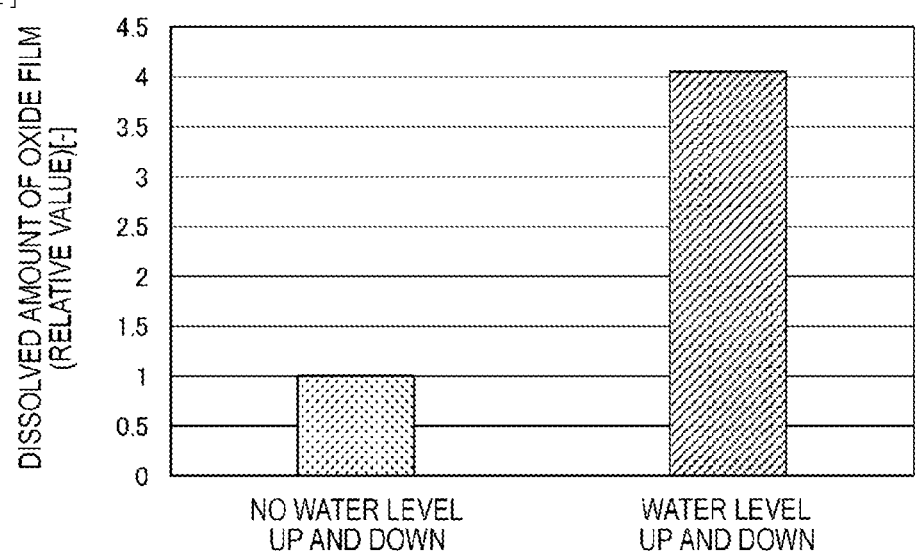

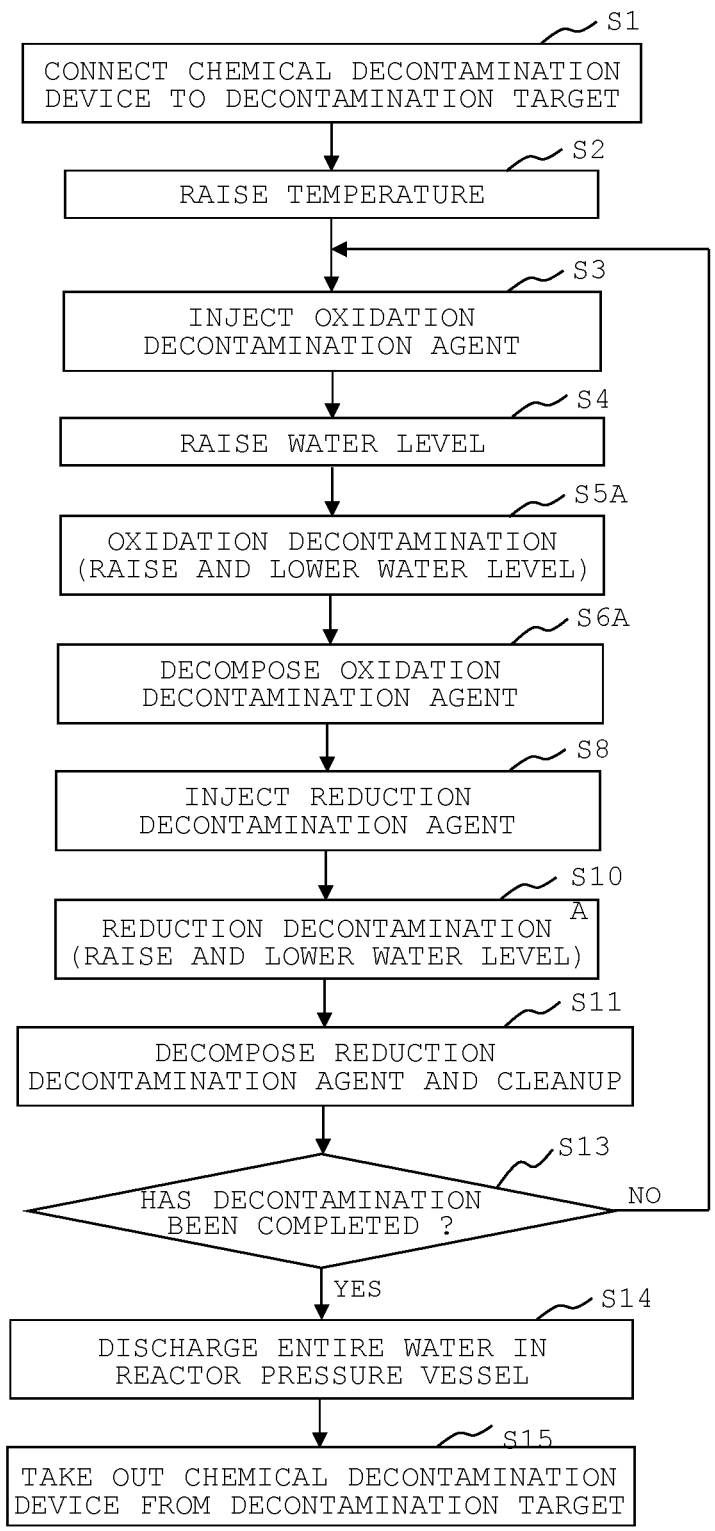
[FIG. 12]

[FIG. 13]
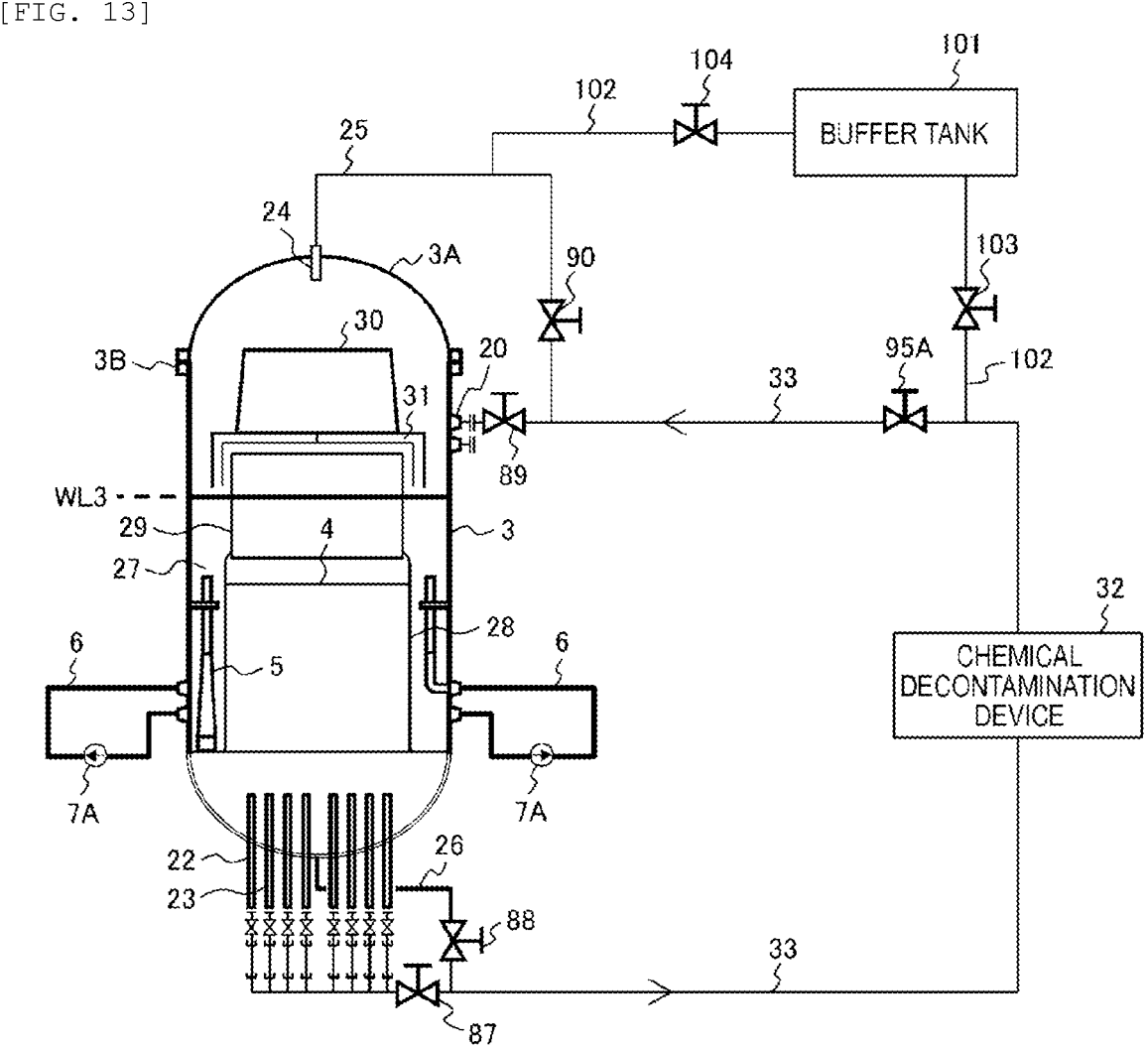

[FIG. 14]
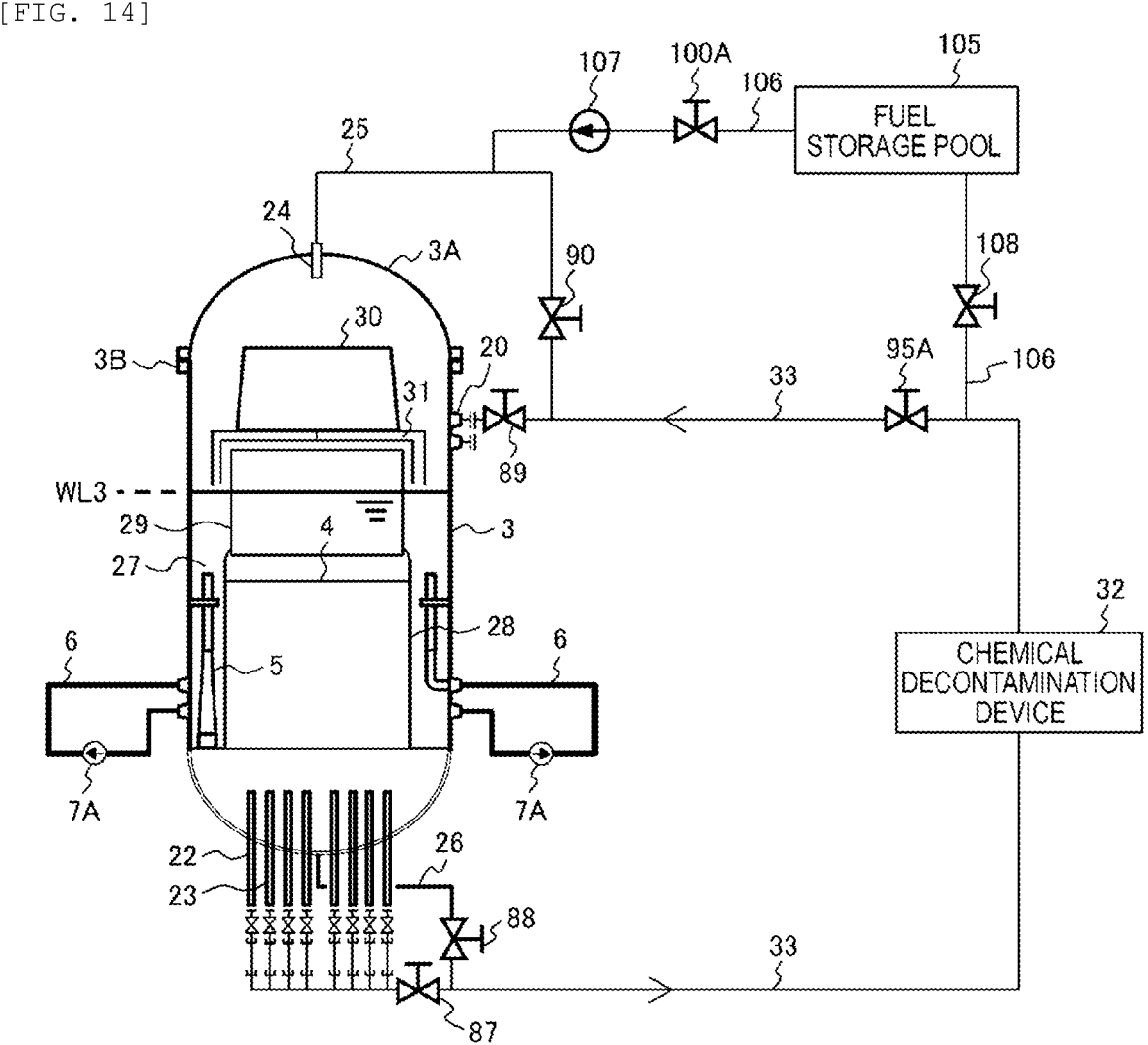

CHEMICAL DECONTAMINATION METHOD

CLAIM OF PRIORITY

The present application claims priority from Japanese Patent application serial no. 2020-164910, filed on Sep. 30, 2020, the content of which is hereby incorporated by reference into this application.

TECHNICAL FIELD

The present invention relates to a chemical decontamination method for chemically removing radionuclides from the surface of a metal member, and more particularly to a chemical decontamination method suitable for application to a boiling water reactor plant.

BACKGROUND ART

For example, a boiling water reactor plant (hereinafter referred to as a BWR plant) includes a nuclear reactor having a reactor core built in a reactor pressure vessel (hereinafter referred to as RPV). The cooling water fed to the reactor core by the recirculation pump (or internal pump) is heated by the heat generated by the nuclear fission of the nuclear fuel material in the fuel assemblies loaded in the reactor core, and a part thereof becomes steam. The steam, in which water is removed as it rises in a gas-water separator in the RPV and moisture is further dehumidified by a steam dryer, is guided from the RPV to the turbine to rotate the turbine. The steam discharged from the turbine is condensed by a condenser to become water. This water is fed to the nuclear reactor as feed water. In order to reduce the generation of radioactive corrosion products in the RPV, mainly metal impurities are removed from the feed water by a filtration demineralization device provided in the feed water pipe. The reactor water is the cooling water existing in the RPV.

Since the corrosion products that are the source of radioactive corrosion products are generated on the surfaces of the components of the BWR plant, such as the RPV and the recirculation system pipe that come into contact with the reactor water, stainless steel and nickel-based alloys that are resistant to corrosion are used as the main components of the primary system of the BWR plant. Further, the RPV made of low alloy steel is overlaid with stainless steel on the inner surface thereof to prevent the low alloy steel from coming into direct contact with the reactor water. Further, the filtration demineralization device of the nuclear reactor cleanup system cleans a part of the reactor water and actively removes metal impurities slightly contained in the reactor water.

However, even if the above-mentioned corrosion countermeasures are taken, the presence of a very small amount of metal impurities in the reactor water is unavoidable. Therefore, some metal impurities, in the form of metal oxides, adhere to the surfaces of the fuel rods in the fuel assemblies. The metal elements contained in the metal impurities adhering to the surfaces of the fuel rods cause a nuclear reaction by irradiation with neutrons emitted by the nuclear fission of the nuclear fuel material in the fuel rods and become radionuclides such as cobalt 60, cobalt 58, chromium 51, manganese 54, and the like. Most of these radionuclides remain attached to the fuel rod surface in the form of oxides, while some radionuclides elute as ions in the reactor water or are re-released into the reactor water as an insoluble solid called a clad, depending on the solubility of the oxides incorporated. Radionuclides contained in the reactor water are removed by a reactor water cleanup device installed in the nuclear reactor cleanup system. Radionuclides not removed by the reactor water cleanup device are accumulated on the surfaces of the components that come in contact with the reactor water while circulating together with the reactor water in the recirculation system and the like. As a result, radiation is radiated from the surfaces of the components, which causes radiation exposure of the worker during the periodic inspection work. The exposure dose of the employee is controlled so as not to exceed the specified value for each person and it is necessary to reduce the exposure dose of each person as economically as possible.

A chemical decontamination method is performed to remove the structural members of a nuclear power plant that have experienced operation, for example, an oxide film containing radionuclides such as cobalt 60 and cobalt 58 formed on the inner surface of a pipe by dissolution using chemicals. Mainly in chemical decontamination, reduction decontamination that removes the film of metal oxides using a reduction decontamination agent (for example, oxalic acid), and oxidation decontamination that oxidatively dissolves chromium in the metal oxides into hexavalent chromium using an oxidation decontamination agent (for example, permanganic acid) are performed.

Several techniques have been proposed for this chemical decontamination method.

For example, in the chemical decontamination method described in JP-B-6470467 (PTL 1), chemical decontamination inside a reactor pressure vessel is performed. Specifically, in a state where the main steam pipe is cut and the cut part of the main steam pipe is closed, a circulation line with a chemical decontamination device is constructed via an RPV nozzle, and the chemical decontamination inside the reactor pressure vessel is performed.

In the chemical decontamination method described in JP-B-6505810 (PTL 2), chemical decontamination is performed for the reactor pressure vessel or the system including the reactor pressure vessel. A decontamination route is constructed so that the reactor pressure vessel becomes a flow path for the chemical decontamination solution, the chemical decontamination solution passes through the decontamination route, the chemical decontamination solution that has passed through the decontamination route is discharged to a temporary circulation system of the chemical decontamination device from the drain pipe connected to the bottom of the reactor pressure vessel, and the chemical decontamination solution cleaned in the temporary circulation system is fed to the reactor pressure vessel for circulation.

The chemical decontamination method described in JP-A-2005-164344 (PTL 3) is performed for the recirculation system pipe connected to the reactor pressure vessel of the BWR plant. Chemical decontamination of the recirculation system pipe is performed by raising or lowering the liquid level of the chemical decontamination solution in the recirculation pipe.

In the chemical decontamination method described in JP-A-2001-235594 (PTL 4), a bag container is arranged in the internal region of the reactor pressure vessel where the chemical decontamination solution is fed, and the water in the bag container is fed or drained, whereby, the liquid level of the chemical decontamination solution in the internal region is adjusted and the chemical decontamination in the reactor pressure vessel is performed.

The steam dryer is arranged above the gas-water separator in the RPV as shown in FIG. 4 of JP-A-2004-205302 (PTL 5). The steam dryer includes a plurality of steam dryer elements arranged in parallel (FIG. 5) and each steam dryer element includes a plurality of corrugated plates that stand vertically to form a steam flow path between each other. These corrugated plates form a plurality of horizontally extending steam flow paths within each steam dryer element (FIG. 6). A hood plate covering the inlet side of each steam flow path is attached to each steam dryer element. The steam rising from the gas-water separator is guided by the hood plate and fed to each steam flow path.

The steam dryer located above the gas-water separator in the RPV is installed inside the RPV for the purpose of removing a small amount of water droplets contained in the steam discharged from the gas-water separator. When steam passes through the steam flow paths formed between a large number of corrugated plates arranged in the steam dryer, water droplets contained in the steam are removed by a plurality of droplet collecting plates attached to each corrugated plate.

CITATION LIST

Patent Literature

[PTL 1] JP-B-6470467
[PTL 2: JP-B-6505810
[PTL 3: JP-A-2005-164344
[PTL 4: JP-A-2001-235594
[PTL 5: JP-A-2004-205302
[PTL 6: JP-A-2011-64481

SUMMARY OF INVENTION

Technical Problem

The steam dryer installed in the RPV was not subject to chemical decontamination when the BWR plant was shut down. However, in the decommissioning of BWR plants, steam dryers may also be subject to decontamination in order to reduce the exposure dose during the dismantling of the steam dryers as much as possible.

From the knowledge of chemical decontamination so far, it is known that the decontamination effect depends on the flow velocity of the chemical decontamination solution. Inside the steam dryer, the chemical decontamination solution is difficult to flow due to a large number of corrugated plates installed. According to the flow analysis simulating the inside of the RPV including the steam dryer, simply circulating the chemical decontamination solution in the closed loop including the decontamination target part and the chemical decontamination device is difficult to make the chemical decontamination solution flow in the steam dryer which has a large resistance due to a large number of corrugated plates. Simply feeding the chemical decontamination solution into the steam dryer where the chemical decontamination solution is difficult to flow as in the past will result in the insufficient dissolution of the oxide film formed in the steam dryer, and the decontamination efficiency will be significantly reduced. Furthermore, sludge containing radionuclides generated when the chemical decontamination solution comes into contact with the surface of each corrugated plate in the steam dryer deposits on the bottom of the steam dryer and hinders the dose drop of the steam dryer due to chemical decontamination.

An object of the present invention is to provide a chemical decontamination method capable of improving the decontamination efficiency by chemical decontamination of a steam dryer in a RPV.

Solution to Problem

A feature of the present invention for achieving the above object is to feed a chemical decontamination aqueous solution into a RPV in which a steam dryer is arranged, and after chemical decontamination of the steam dryer, to lower the water level of the chemical decontamination aqueous solution existing in the PV to a first water level below the lower end of the steam dryer.

By lowering the water level of the chemical decontamination aqueous solution existing in the RPV to the first water level below the lower end of the steam dryer, sludge containing radioactive substances deposited on the low plate of the steam dryer can be discharged to the outside of the steam dryer together with the chemical decontamination aqueous solution. Therefore, the decontamination efficiency of the steam dryer by chemical decontamination can be improved and the dose of the steam dryer can be significantly reduced.

Preferably, the water level of the chemical decontamination aqueous solution in the RPV is raised to a second water level above the upper end of the steam dryer, and then the water level of the chemical decontamination aqueous solution is desirably lowered from the second water level to the first water level.

By raising the water level of the chemical decontamination aqueous solution in the RPV to the second water level above the upper end of the steam dryer, sludge deposited on the bottom plate of the steam dryer can be lifted and discharged to the outside of the steam dryer, and therefore, the decontamination efficiency of the steam dryer by chemical decontamination can be further improved.

Advantageous Effects of Invention

According to the present invention, the dose of the steam dryer can be significantly reduced, and thus, the steam dryer can be disassembled at a low exposure dose and low cost.

BRIEF DESCRIPTION OF DRAWINGS

FIG. 1 is a flowchart showing a procedure of a chemical decontamination method of Embodiment 1 applied to a BWR plant, which is a suitable embodiment of the present invention.

FIG. 2 is an explanatory diagram showing a state in which a chemical decontamination device used in the chemical decontamination method of Embodiment 1 is connected to the RPV of a plant.

FIG. 3 is a detailed configuration diagram of the chemical decontamination device shown in FIG. 2.

FIG. 4 is an explanatory diagram showing a state in which the liquid level of the chemical decontamination solution is lowered in the RPV during chemical decontamination of the steam dryer in the RPV.

FIG. 5 is a configuration diagram showing a holding structure of the steam dryer shown in FIG. 4.

FIG. 6 is a perspective view showing a detailed configuration of a steam dryer element included in the steam dryer shown in FIG. 4.

FIG. 7 is a VI-VI cross-sectional view of the steam dryer element shown in FIG. 6.

FIG. 8 is a vertical cross-sectional view of the steam dryer element shown in FIG. 6.

FIG. 9 is an explanatory diagram showing a state in which the liquid level of the chemical decontamination solution is raised above the upper end of the steam dryer in the RPV during chemical decontamination of the steam dryer in the RPV.

FIG. 10 is an explanatory diagram showing a state in which during chemical decontamination of the steam dryer in the RPV, the liquid level of the chemical decontamination solution is lowered to below the lower end of the steam dryer in the RPV and the chemical decontamination solution is further fed to the steam dryer from a head spray nozzle provided at the top of the RPV.

FIG. 11 is an explanatory diagram showing a difference in the dissolved amount (relative value) of the oxide film formed on the steam dryer depending on whether or not the water level of the chemical decontamination solution rises and falls.

FIG. 12 is a flowchart showing a procedure of a chemical decontamination method of Embodiment 2 applied to a BWR plant, which is another suitable embodiment of the present invention.

FIG. 13 is an explanatory diagram showing a state in which the chemical decontamination device used in the chemical decontamination method of Embodiment 2 is connected to a BWR plant.

FIG. 14 is an explanatory diagram showing a state in which a chemical decontamination device used in the chemical decontamination method of Embodiment 3 applied to a BWR plant, which is another suitable embodiment of the present invention, is connected to a BWR plant.

DESCRIPTION OF EMBODIMENTS

The present inventors have conducted diligent studies in order to solve the above problems. As a result, the inventors have found that the chemical decontamination solution in the steam dryer provided in the RPV can be forcibly flowed by raising and lowering the water level of the chemical decontamination solution in the RPV during chemical decontamination and that it is possible to remove sludge containing radionuclides deposited in the steam dryer, especially on the bottom surface of the steam dryer, by lowering the water level below the lower end of the steam dryer.

The experiment that found the above findings will be explained in more detail. FIG. 11 shows the dissolved amount (relative value) of the oxide film when the chemical decontamination solution is caused to flow by raising or lowering the water level of the chemical decontamination solution based on the amount of the oxide film dissolved when the oxide film formed on the surface of the test piece is dissolved by the stagnant chemical decontamination solution. In order to simulate the oxide film formed on the inner surface of the steam dryer provided in the RPV of an actual machine, using a test piece made of stainless steel (for example, SUS304) subjected to steam oxidation treatment at 500° C. for 500 hours, each process of steps S3 to S13 in the chemical decontamination method shown in FIG. 1 was repeated twice, and the amount of the oxide film dissolved on the surface of the above test piece was examined. Regarding the result of "no water level up and down" shown in FIG. 11, among the steps shown in the flowchart of the chemical decontamination method of FIG. 1, chemical decontamination was performed without performing steps S4, S7, S9, and S12 of raising the liquid level and lowering the liquid level. As shown in FIG. 11, it was found that by performing the "water level up and down" of the reduction decontamination solution in the RPV, the amount of the oxide film dissolved on the surface of the test piece in the case of "water level up and down" was about 4 times the amount of the oxide film dissolved on the surface of the test piece in the case of "no water level up and down".

In addition, most of the sludge deposited on the bottom of the steam dryer is removed along with the discharge of the chemical decontamination solution from inside the steam dryer by repeatedly lowering the water level of the chemical decontamination solution from the submerged level of the steam dryer to below the lower end of the steam dryer. Further, after lowering the water level of the chemical decontamination solution in the RPV below the lower end of the steam dryer, the chemical decontamination solution is sprayed from a head spray nozzle provided at the top of the RPV toward the steam dryer. The spray of the chemical decontamination solution further discharges the sludge remaining at the bottom of the steam dryer to the outside of the steam dryer.

From the above examination results, it has been found that the dose rate of the steam dryer can be significantly reduced by raising and lowering the water level of the chemical decontamination solution in a range from a position above the upper end of the steam dryer to a position below the lower end of the steam dryer during chemical decontamination in the RPV.

In this specification, chemical decontamination using a chemical decontamination aqueous solution is performed. Specifically, in chemical decontamination, oxidation decontamination is performed using an oxidation decontamination aqueous solution containing an oxidation decontamination agent as a chemical decontamination aqueous solution, and reduction decontamination is performed using a reduction decontamination aqueous solution containing a reduction decontamination agent as a chemical decontamination aqueous solution.

Preferable embodiments of the chemical decontamination method for the steam dryer in the RPV, which reflect the above examination results, will be described below.

Embodiment 1

The chemical decontamination method of Embodiment 1, which is a suitable embodiment of the present invention, will be described with reference to FIGS. 1 to 10. The chemical decontamination method of this embodiment is applied to a BWR plant.

The schematic configuration of this BWR plant will be described with reference to FIG. 2. A BWR plant 1 includes a nuclear reactor 2, a turbine 9, a condenser 10, a recirculation system, a nuclear reactor cleanup system, a feed water system, and the like. The nuclear reactor 2 is a steam generator and includes a reactor pressure vessel (hereinafter referred to as RPV) 3 having a reactor core 4 built in, and a plurality of jet pumps 5 are installed in an annular downcomer 27 formed between the outer surface of a reactor core shroud 28 surrounding the reactor core 4 in the RPV 3 and the inner surface of the RPV 3. An upper lid 3A (see FIG. 4) is attached to a flange 3B (see FIG. 4) at the upper end of the RPV 3 to seal the RPV 3. As shown in FIG. 5, a plurality of brackets (pressing members) 110 extending in the horizontal direction are attached to the inner surface of the upper lid 3A.

The reactor core 4 is loaded with a large number of fuel assemblies (not shown). The fuel assembly contains a plurality of fuel rods filled with a plurality of fuel pellets made of nuclear fuel material. The nuclear reactor 2 is installed in a primary containment vessel 19 arranged in the nuclear reactor building (not shown).

A plurality of gas-water separators 29 are attached to the upper end portion of the reactor core shroud 28 and attached to a shroud head (not shown) covering the reactor core 4, as shown in FIG. 4, thereby extending upward from the shroud head. A stainless steel steam dryer 30 is placed above the gas-water separators 29 in the RPV 3 (see FIG. 4). A drain line 31 is installed at the lower end portion of the steam dryer 30 and both ends of the drain line 31 extend downward from the upper end of the gas-water separator 29.

The detailed configuration of the steam dryer 30 will be described with reference to FIGS. 6 to 8. The steam dryer 30 includes a plurality of steam dryer elements 91, and these steam dryer elements 91 are arranged in parallel as shown in FIG. 5 of JP-A-2004-205302. The steam dryer element 91 includes a plurality of corrugated plates 93 and a pair of side walls 98 arranged to face each other, and the plurality of corrugated plates 93 are arranged in parallel between the pair of side walls 98 with a predetermined interval. Steam flow paths 95 (FIG. 7) are formed between the corrugated plates 93, respectively. A top plate 97 that covers the upper part of each corrugated plate 93 is attached to the upper end portions of the pair of side walls 98. The end portion of each corrugated plate 93 on the inlet side of the steam flow path 95 and the end portion of each corrugated plate 93 on the outlet side of the steam flow path 95 are attached to a pair of fixing rods 100 attached to the pair of side walls 98.

A rectifying plate 96 (see FIGS. 6, 7, and 8) having a large number of through-holes is arranged so as to cover the inlet side of the steam flow path 95 and is attached to the pair of side walls 98 and the top plate 97. A rectifying plate 99 (see FIGS. 7 and 8) having a large number of through-holes is arranged so as to cover the outlet side of the steam flow path 95 and is attached to the pair of side walls 98 and the top plate 97. A hood plate 92 whose upper end portion is attached to the top plate 97 covers the front surface of the rectifying plate 96, and a steam flow path that guides steam discharged from the gas-water separator 29 to each steam flow path 95 is formed between the hood plate 92 and the rectifying plate 96.

Each corrugated plate 93 is arranged from the rectifying plate 96 toward the rectifying plate 99 and the steam flow path 95 formed between the corrugated plates 93 also extends from the rectifying plate 96 toward the rectifying plate 99. Each corrugated plate 93 extends from a bottom plate (not shown) provided at the lower end portion of the steam dryer element 91 toward the top plate 97, and the lower end of each corrugated plate 93 is in contact with the upper surface of the bottom plate thereof, and the upper end of each corrugated plate 93 is in contact with the lower surface of the top plate 97. A plurality of droplet collecting plates 94 are attached to each corrugated plate 93, and a drain pocket 94A is formed between the corrugated plate 93 and the droplet collecting plate 94. The drain pocket 94A is a space for capturing droplets and a liquid film. The lower end of each droplet collecting plate 94 is in contact with the upper surface of the bottom plate, and the upper end of each droplet collecting plate 94 is in contact with the lower surface of the top plate 97. Each drain pocket 94A also extends from the upper surface of the bottom plate thereof toward the lower surface of the top plate 97. A plurality of (for example, 3 or 4) hangers 109 are attached to the upper surface of the top plate 97, which is the upper end of the steam dryer 30 (see FIG. 5). The number of hangers 109 is the same as the number of blankets 110 attached to the inner surface of the upper lid 3A. The upper end of the steam dryer 30 (upper surface of the top plate 97) is located above the upper surface of the flange 3B provided at the upper end of the RPV 3, and the upper end of the hanger 109 is located above the upper end of the steam dryer 30.

Each of the above-mentioned corrugated plate 93, droplet collecting plate 94, rectifying plates 96 and 99, side wall 98, top plate 97, and fixing rod 100 configuring the stainless steel steam dryer 30 is made of stainless steel. Each of the corrugated plate 93, the droplet collecting plate 94, the rectifying plates 96 and 99, the side wall 98, the top plate 97, and the fixing rod 100 is a component of the steam dryer 30.

The above-mentioned drain line 31 is arranged below the above-mentioned bottom plate of the steam dryer 30, and a drain discharge hole (not shown) formed in the bottom plate at the position of each drain pocket 94A is communicating with a space in the drain line 31.

Although not shown in FIG. 4, a cylindrical skirt is attached to the lower end portion of the steam dryer 30 (see paragraph 0023 and FIG. 1 of JP-A-2011-64481 (PTL 6)) and extends downwards from the steam dryer 30. The skirt is arranged between the inner surface of the RPV 3 and the gas-water separator 29 and surrounds the gas-water separator 29. The downward portion of the drain line 31 shown in FIG. 4 is also arranged inside the skirt.

A plurality of control rod drive mechanism housings (CRD housings) 22 and a plurality of neutron measurement housings (ICM housings) 23 are attached to the bottom thereof through the bottom of the RPV 3 as shown in FIG. 2. A control rod drive mechanism (CRD) (not shown) for operating a control rod (not shown) inserted into the reactor core 4 is arranged in the CRD housing 22.

The recirculation system includes a stainless steel recirculation system pipe 6 and a recirculation pump 7 installed in the recirculation system pipe 6. The feed water system is configured by installing a condensate pump 12, a condensate cleanup device (for example, a condensate demineralizer) 13, a low-pressure feed water heater 14, a feed water pump 15, and a high-pressure feed water heater 16 in this order from the condenser 10 toward the RPV 3 in a feed water pipe 11 connecting the condenser 10 and the RPV 3. One end portion of the feed water pipe 11 is connected to a feed water nozzle 21 provided in the RPV 3. The other end portion of a main steam pipe 8 whose one end is connected to a main steam nozzle 20 of the RPV 3 is connected to the turbine 9.

Although not shown, the nuclear reactor cleanup system includes a cleanup system pump, a regenerative heat exchanger, a non-regenerative heat exchanger, and a reactor water cleanup device in this order in a cleanup system pipe that connects the recirculation system pipe 6 and the feed water pipe 11. The cleanup system pipe is connected to the recirculation system pipe 6 upstream of the recirculation pump 7.

The cooling water in the RPV 3 (hereinafter referred to as reactor water) is boosted by the recirculation pump 7 and sprayed into the jet pump 5 through the recirculation system pipe 6. The reactor water existing around the nozzle of the jet pump 5 in the downcomer 27 is also sucked into the jet pump 5 and fed to the reactor core 4 together with the above-mentioned reactor water sprayed into the jet pump 5. The reactor water fed to the reactor core 4 is heated by the heat generated by the nuclear fission of the nuclear fuel material in the fuel rods in the fuel assembly, and a part of the reactor water becomes steam. The reactor water rising in the reactor core 4 becomes a gas-liquid two-phase flow containing the steam and flows into each gas-water separator 29 to which the shroud head is attached, and rises in these gas-water separators 29. The reactor water contained in the gas-liquid two-phase flow is separated by the gas-water separator 29 and discharged to the downcomer 27.

The flow state of the steam discharged from the gas-water separator 29 in the steam dryer 30 will be described with reference to FIGS. 7 and 8. The steam discharged from the gas-water separator 29 is guided into the steam dryer 30 through the inside of the cylindrical skirt described above. The cylindrical skirt prevents the steam discharged from the gas-water separator 29 from flowing into the main steam pipe 8 from the main steam nozzle 20 without passing through the steam dryer 30. The steam discharged from the gas-water separator 29 rises in the flow path formed between the hood plate 92 and the rectifying plate 96, passes through a large number of through-holes formed in the rectifying plate 96, and flows into the steam flow paths 95 formed between the corrugated plates 93. This steam flows in the steam flow path 95 from the rectifying plate 96 toward the rectifying plate 99. The water droplets contained in the steam flow into the drain pockets 94A from the inlet portion formed between the droplet collection plates 94 adjacent to each other in the above-mentioned flow direction. The droplets separated in this way descend downward in the drain pocket 94A, are guided into the drain line 31, are discharged to the outside of the steam dryer 30, and reach the inside of the downcomer 27.

The steam separated from the droplets in the steam flow path 95 is discharged to the outside of the steam dryer 30 through a large number of through-holes formed in the rectifying plate 99 and is guided into the main steam pipe 8 through the main steam nozzle 20. This steam is guided to the turbine 9 through the main steam pipe 8 to rotate the turbine 9. A generator (not shown) connected to the turbine 9 rotates to generate electric power. The steam discharged from the turbine 9 is condensed by the condenser 10 to become water. This water is fed into the RPV 3 as feed water through the feed water pipe 11. The feed water flowing through the feed water pipe 11 is boosted by the condensate pump 12, impurities are removed by the condensate cleanup device 13, and the pressure is further boosted by the feed water pump 15. This feed water is heated by the extracted steam extracted from the turbine 9 by an extraction pipe 17 in the low-pressure feed water heater 14 and the high-pressure feed water heater 16 and guided into the RPV 3. A drain water recovery pipe 18 connected to the high-pressure feed water heater 16 and the low-pressure feed water heater 14 is connected to the condenser 10. The drain water, which is the condensed water of the above-mentioned extracted steam generated in the high-pressure feed water heater 16 and the low-pressure feed water heater 14, is fed to the condenser 10 through the drain water recovery pipe 18.

As shown in FIG. 3, a chemical decontamination device 32 includes a circulation pipe 33, a circulation pump 35, a cooler 66, a mixed bed resin tower 65, a cation exchange resin tower 64, a filter 63, a heater 62, a decomposition device 59, a surge tank 53, an oxidant injection device 54, a pH adjustment agent injection device 43, and an oxidation decontamination agent injection device 48.

An on-off valve 34, the circulation pump 35, valves 36, 37, 38, and 39, the heater 62, valves 40 and 41, and an on-off valve 42 are provided in the circulation pipe 33 in this order from the upstream. Valves 67 and 68 are installed in a pipe 66A that bypasses the circulation pump 35 and is connected to the circulation pipe 33 at both ends. A pH meter 77 is attached to a pipe 66A between the valves 67 and 68. Since the flow velocity of the decontamination aqueous solution (for example, permanganic acid aqueous solution or oxalic acid aqueous solution) is high in the circulation pipe 33, when the pH meter 77 is installed in the circulation pipe 33, the pH of the decontamination aqueous solution cannot be measured accurately. Therefore, the pH meter 77 is installed in the pipe 66A that bypasses the circulation pump 35, which can be adjusted to a set flow rate corresponding to the pH meter 77. The flow rate of the decontamination aqueous solution flowing through the pipe 66A is adjusted by controlling the opening degree of the valve 68 (or valve 67).

The cooler 66 and valves 71 and 70 are installed in a pipe 69 that bypasses the valve 36 and is connected to the circulation pipe 33 at both ends. The mixed bed resin tower 65 and valves 74 and 73 are installed in a pipe 72 that is connected to the circulation pipe 33 at both ends and bypasses the valve 37. The cation exchange resin tower 64 and valves 77A and 76 are installed in a pipe 75 that is connected to the circulation pipe 33 at both ends and bypasses the valve 38. The cation exchange resin tower 64 is filled with a cation exchange resin, and the mixed bed resin tower 65 is filled with a cation exchange resin and an anion exchange resin. A pipe 78 that bypasses the valve 39 is connected to the circulation pipe 33, and a valve 79, the filter 63, and a valve 80 are installed in the pipe 78.

A pipe 81 in which the decomposition device 59 located downstream of the heater 62 is installed bypasses the valve 40 and is connected to the circulation pipe 33. The decomposition device 59 is provided in pipe 81 that bypasses valve 40, and pipe 81 is provided with a valve 82 on the upstream side of the decomposition device 59 and a valve 82A on the downstream side of the decomposition device 59. The decomposition device 59 is filled with, for example, an activated carbon catalyst produced by spreading ruthenium on the surface of activated carbon. Both ends of a pipe 83 that bypasses the valve 41 are connected to the circulation pipe 33, and the surge tank 53 is connected to the pipe 83. The heater 60 is arranged in the surge tank 53. A hopper 87A for charging a chemical such as oxalic acid is installed at the top of the surge tank 53. A pump 61 and a valve 85 are provided downstream of the surge tank 53 in the pipe 83. The pump 61 is arranged between the surge tank 53 and the valve 85.

The oxidation decontamination agent injection device 48 includes a chemical solution tank 49, an injection pump 50, and an injection pipe 52. The chemical solution tank 49 is connected to the circulation pipe 33 by the injection pipe 52 provided with the injection pump 50 and a valve 51. An aqueous solution of permanganic acid (permanganic acid aqueous solution), which is an oxidation decontamination agent, is filled in the chemical solution tank 49.

The pH adjustment agent injection device 43 includes a chemical solution tank 44, an injection pump 45, and an injection pipe 47. The chemical solution tank 44 is connected to the circulation pipe 33 by the injection pipe 47 provided with the injection pump 45 and a valve 46. An aqueous solution of hydrazine (hydrazine aqueous solution), which is a pH adjustment agent, is filled in the chemical solution tank 44.

The injection pipes 52 and 47 are connected to the circulation pipe 33 between valve 41 and the on-off valve 42 in this order.

The oxidant injection device 54 includes a chemical solution tank 55, a feed pump 56, and a feed pipe 58. The chemical solution tank 55 is connected to the pipe 81 between the decomposition device 59 and the valve 82 by the feed pipe 58 provided with the feed pump 56 and a valve 57. Hydrogen peroxide, which is an oxidant, is filled in the chemical solution tank 55. This hydrogen peroxide is a chemical substance used for decomposing oxalic acid and the pH adjustment agent (for example, hydrazine) in the decomposition device 59.

The chemical decontamination method of this embodiment will be described below based on the procedure shown in FIG. 1. In this embodiment, the chemical decontamination method described in JP-A-2000-105295 is used as an example of chemical decontamination. In the chemical decontamination method of this embodiment, the chemical decontamination device 32 is used, and each process of steps S1 to S15 shown in FIG. 1 is performed.

When the chemical decontamination method of this embodiment is performed, since the chemical decontamination aqueous solution is fed into the RPV 3, the reactor core 4 in the RPV 3 needs to be in a state where the fuel assemblies are not loaded. Therefore, before performing the chemical decontamination method, all the fuel assemblies loaded in the reactor core 4 must be transferred to a fuel storage pool or the like. This transfer of the fuel assemblies will be described.

In the BWR plant 1 whose operation has been stopped, which is the target of decommissioning, the upper lid 3A of the RPV 3 is removed, and the cooling water is fed into the RPV 3 from the reactor auxiliary cooling water system (not shown). The main steam isolation valve (not shown) provided in the main steam pipe 8 is closed. The fed cooling water is filled to a set level in a reactor well (not shown) formed above the RPV 3. After that, the steam dryer 30 in the RPV 3 and the shroud head to which the gas-water separator 29 was attached were sequentially removed from the RPV 3, and those removed were suspended on an overhead crane (not shown) installed on the ceiling of the primary containment vessel 19 and sequentially transferred to the equipment temporary storage pool (not shown) by moving the overhead crane. The steam dryer 30 is suspended from the overhead crane by hooking the steam dryer 30 on each of a plurality of hangers 109 in which a wire is suspended from the hook of the overhead crane and attached to the upper end (the upper surface of the top plate 97) of the steam dryer 30.

Then, using a refueling machine (not shown), all the fuel assemblies loaded in the reactor core 4 are taken out from the reactor core 4 and transferred to the fuel storage pool. Following the transfer of all fuel assemblies to the fuel storage pool, all control rods (not shown) present in the RPV 3 are sequentially transferred to the fuel storage pool by the refueling machine. After the transfer of all control rods to the fuel storage pool is completed, the steam dryer 30 and the shroud head to which the gas-water separator 29 is attached are moved from the equipment temporary storage pool to a predetermined position for each in the RPV 3 in the order opposite to the order of having been taken out from the RPV 3 and installed at the predetermined position. After that, the cooling water in the RPV 3 is discharged to the outside of the RPV 3 through the drain pipe 26 (see FIG. 2) connected to the bottom of the RPV 3. The cooling water discharged from the RPV 3 is discharged to the cleanup system pipe (not shown) to which the drain pipe 26 is connected via the drain pipe 26. The radioactive substances contained in the cooling water discharged from the cleanup system pipe are removed by the reactor water cleanup device (not shown) provided in the cleanup system pipe, and the cooling water discharged from the reactor water cleanup device is guided from the cleanup system pipe to a radioactive liquid waste treatment device on the downstream side of the reactor water cleanup device. This discharge of the cooling water lowers the water level of the cooling water in the reactor well. After the water level is lowered to the position of the upper surface of the flange 3B of the RPV 3 to which the upper lid 3A is attached, which is located at the upper end of the RPV 3, the upper lid 3A provided with the head spray nozzle 24 at the top is attached to the flange 3B of the RPV 3 and blocks the RPV 3. When the upper lid 3A is attached to the flange 3B of the RPV 3, the lower surface of each blanket 110 comes into contact with each hanger 109 attached to the upper surface of the top plate 97 of the steam dryer 30, and each blanket 110 presses the steam dryer 30 downward.

After that, as described above, the cooling water in the RPV 3 is discharged to the cleanup system pipe via the drain pipe 26, passes through the reactor water cleanup device of the cleanup system pipe, and then is guided to the radioactive liquid waste treatment device. Eventually, all the cooling water in the RPV 3 is discharged to the radioactive liquid waste treatment device.

In the BWR plant 1 which is the target of decommissioning, the recirculation pump 7 is often in a state of not being able to be driven. Therefore, after all the cooling water in the RPV 3 is discharged, the recirculation pump 7 (see FIG. 2) installed in the recirculation system pipe 6 is removed from the recirculation system pipe 6, and a temporary pump 7A is installed in the recirculation system pipe 6 as shown in FIG. 4, instead of the recirculation pump 7. In the BWR plant 1 which is the target of decommissioning, the recirculation pump 7 may be in a state of being able to be driven. When the recirculation pump 7 can be driven, the work of removing the recirculation pump 7 from the recirculation system pipe 6 and installing the temporary pump 7A in the recirculation system pipe 6 is not performed, and the recirculation pump 7, instead of the temporary pump 7A, is driven at the time of driving the temporary pump 7A described later.

A chemical decontamination device is connected to the decontamination target in a state where the fuel assembly does not exist in the reactor core (step S1). After all the cooling water in the RPV 3 is discharged, the chemical decontamination device 32 is connected to the RPV 3 which is the chemical decontamination target. For example, in all of the plurality of CRD housings 22 and the plurality of ICM housings 23 attached to the bottom of the RPV 3 and extending downward, the lower flange attached to the flange provided at the lower end of each of these housings is removed. A connecting jig (not shown) is connected to each flange of all CRD housings 22 and all ICM housings 23, from which the lower flange has been removed. Since all the cooling water in the RPV 3 is discharged to the outside of the RPV 3, when the lower flange is removed from each CRD housing 22 and each ICM housing 23, the work of connecting the connecting jig to each CRD housing 22 and each ICM housing 23 can be easily performed without causing the outflow of the cooling water from CRD housing 22 and each ICM housing 23 to the inside the RPV 3.

The above connecting jig includes another flange separately attached to each flange provided at the lower end of each of the corresponding CRD housing 22 and ICM housing 23, and a decontamination solution distribution pipe connected to these other flanges. One end portion of the circulation pipe 33 of the chemical decontamination device 32 is connected to the decontamination solution distribution pipe. Further, one end of the circulation pipe 33 is connected to the drain pipe 26.

The reason for connecting the connecting jig to each flange of all CRD housings 22 and each flange of all ICM housings 23, from which the lower flange has been removed, is because it is preferable to perform chemical decontamination with respect to the inside of all CRD housings 22 and all ICM housings 23, and further, the circulation flow rate is increased.

The other end portion of the circulation pipe 33 is connected to the main steam nozzle 20 of the RPV 3. The connection of the circulation pipe 33 to the main steam nozzle 20 is performed as follows. A plurality of main steam nozzles 20 (usually four) provided in the RPV 3 are cut, and the other end of the circulation pipe 33 is connected to one of the cut main steam nozzles 20. The other cut main steam nozzles 20 are sealed by a closing jig to prevent the chemical decontamination solution fed into the RPV 3 from flowing out from the cut main steam nozzles 20. The head spray nozzle 24 at the top of the upper lid 3A is connected to the circulation pipe 33 between the valve 89 and the on-off valve 42 by the pipe 25. The valve 89 is installed in the circulation pipe 33. A valve 90 is provided in the pipe 25.

One end portion of the circulation pipe 33 is connected to each of the CRD housing 22 and the ICM housing 23, and the other end portion of the circulation pipe 33 is connected to the main steam nozzle 20, and thereby a closed loop is formed in which the steam dryer 30 to be chemically decontaminated is arranged and which includes the internal region in the RPV 3 and the circulation pipe 33.

One end portion of the circulation pipe 33 of the chemical decontamination device 32 may be independently connected to any one of the CRD housing 22, the ICM housing 23, and the drain pipe 26. However, in order to increase the circulation amount of the chemical decontamination solution, it is more preferable to connect one end portion of the circulation pipe 33 to each of the CRD housing 22, the ICM housing 23, and the drain pipe 26 as described above.

In this embodiment, the chemical decontamination device 32 is connected to the CRD housing 22, the ICM housing 23, the main steam nozzle 20, and the head spray nozzle 24, but the chemical decontamination device 32 may be connected using a pipe connected to the RPV 3 other than the above.

The connection points at the other end portion of the circulation pipe 33 include the main steam nozzle 20, the feed water nozzle 21, the head spray nozzle 24, and the like. In order to completely fill the inside of the RPV 3 with the chemical decontamination solution, it is preferable to connect the other end portion of the circulation pipe 33 to the main steam nozzle 20 which can reduce the retention portion of the upper part in the RPV 3.

Each process of steps S2 to S14 described below is performed on the RPV 3 by the chemical decontamination device 32.

The temperature of the water used for chemical decontamination is raised (step S2). First, the chemical decontamination device 32 and the RPV 3 are filled with water. This water filling is performed by feeding demineralized water from the reactor auxiliary cooling water into the chemical decontamination device 32 and the RPV 3 in which water does not exist. When the water level of the cooling water in the RPV 3 has been raised to a water level WL1 lower than the lower end of the steam dryer 30, the filling of the cooling water in the RPV 3 is completed and the water level of the cooling water in the RPV 3 is maintained at the water level WL1.

The circulation pump 35 is driven in the state where the on-off valves 34, 36, 37, 38, 39, 40, and 41 and the on-off valve 42, the valves 87, 88, and 89 are opened, respectively, and the other valves are closed. As a result, the water flowing in the circulation pipe 33 is heated to 90° C. by the heater 62. The heated water is circulated in a closed loop including the RPV 3 and the circulation pipe 33. That is, the water in the RPV 3 flows into the circulation pipe 33 through each of the CRD housing 22, the ICM housing 23, and the drain pipe 26 by the drive of the circulation pump 35, is heated by the heater 62 while flowing through the circulation pipe 33, and is guided into the RPV 3 from the main steam nozzle 20. The water at 90° C. fed from the main steam nozzle 20 into the RPV 3 through the circulation pipe 33 falls in the annular region formed between the inner surface of the RPV 3 and the cylindrical skirt and reaches the downcomer 27. Further, the temporary pump 7A is driven, and the water in the RPV 3 is circulated in the downcomer 27, the recirculation system pipe 6, the reactor core shroud 28 in which the fuel assembly does not exist, the gas-water separator 29, and the downcomer 27. The capacity of the temporary pump 7A is extremely large compared to the capacity of the circulation pump 35 installed in the circulation pipe 33, but since the water level in the RPV 3 is held at the water level WL1 lower than the lower end of the steam dryer 30, the water discharged from the gas-water separator 29 does not flow into the steam dryer 30 but flows in the region formed between the lower end of the steam dryer 30 and the upper ends of the plurality of gas-water separator s 29 and between the gas-water separators 29 toward the inner surface of the RPV 3, descends along the inner surface of the skirt, and is guided to the downcomer 27.

An oxidation decontamination agent is injected (step S3). When the temperature of the water circulating in the closed loop reaches 90° C., the valve 51 of the oxidation decontamination agent injection device 48 is opened and the injection pump 50 is started. The permanganic acid aqueous solution in the chemical solution tank 49 is injected into the water flowing in the circulation pipe 33 through the injection pipe 52. Since the circulation pump 35 is being driven, the permanganic acid aqueous solution circulates in the closed loop including the internal region of the RPV 3 and the circulation pipe 33.

When the water level of the permanganic acid aqueous solution in the RPV 3 is at the position of the water level WL1 below the lower end of the steam dryer 30, the permanganic acid aqueous solution is injected from the chemical solution tank 49 into the circulation pipe 33 so that the permanganic acid concentration of the permanganic acid aqueous solution in the RPV 3 becomes a set concentration (a second set concentration described later) when the water level of the permanganic acid aqueous solution in the RPV 3 has been raised to the position of a water level WL2 (FIG. 9) above the upper end of the steam dryer 30.

The set concentration of permanganic acid (hereinafter referred to as a first set concentration) of the permanganic acid aqueous solution in the RPV 3 when the water level of the permanganic acid aqueous solution is at the position of the water level WL1 below the lower end of the steam dryer 30 is higher than the set concentration of permanganic acid in the permanganic acid aqueous solution in the RPV 3 (hereinafter referred to as the second set concentration) when the water level of the permanganic acid aqueous solution is at the position of the water level WL2 above the upper end of the steam dryer 30. When the permanganic acid concentration of the permanganic acid aqueous solution reaches the first set concentration by injecting the permanganic acid aqueous solution in a state where the water level of the permanganic acid aqueous solution is the water level WL1, the injection pump 50 is stopped, the valve 51 is closed, and the injection of the permanganic acid aqueous solution from the chemical solution tank 49 into the circulation pipe 33 is stopped.

In the process of step S3, when the permanganic acid aqueous solution is injected into the RPV 3, the temporary pump 7A is being driven, and the permanganic acid aqueous solution in the RPV 3 is circulated in the downcomer 27, the recirculation system pipe 6, the reactor core shroud 28 where the fuel assembly does not exist, the gas-water separator 29, and the downcomer 27, and the permanganic acid aqueous solution in the RPV 3 is agitated. Therefore, the permanganic acid concentration of the permanganic acid aqueous solution in the RPV 3 becomes uniform.

The water level of the oxidation decontamination solution is raised (step S4). After the injection of the permanganic acid aqueous solution into the RPV 3 is stopped, the demineralized water from the reactor auxiliary cooling water described above is fed into the RPV 3 via the circulation pipe 33 of the chemical decontamination device 32. The feed of this demineralized water raises the water level of the permanganic acid aqueous solution in the RPV 3. The feed of demineralized water raises the water level of the permanganic acid aqueous solution in the RPV 3 from the water level WL1 to the water level WL2 located above the upper end of the steam dryer 30. When the water level of the permanganic acid aqueous solution has been raised to the water level WL2 located above the upper end of the steam dryer 30, the feed of demineralized water into the RPV 3 is stopped, and the permanganic acid concentration of the permanganic acid aqueous solution in the RPV 3 is the second set concentration. The water level of the permanganic acid aqueous solution in the RPV 3 is measured by a water level gauge (not shown) provided in the RPV 3. The water level of the permanganic acid aqueous solution in the RPV 3 raised above the upper end of the steam dryer 30 is located above the upper end of the steam dryer 30, and is a water level within a range at or lower than the position of the lower surface of the bracket 110 attached to the upper lid 3A that presses the hanger 109 provided in the steam dryer 30, that is, the position of the lower surface of the bracket 110 that presses the steam dryer 30, in the axial direction of the RPV 3.

When the water level of the permanganic acid aqueous solution in the RPV 3 is raised from the water level WL1 to the water level WL2, the oxide film containing the radionuclides formed by the permanganic acid aqueous solution on the surface of the steam dryer 30 and the like in contact with the permanganic acid aqueous solution is almost not dissolved. Therefore, in the process of step S4, almost no sludge containing radionuclides is generated due to the dissolution of the oxide film, and almost no sludge is deposited on the upper surface of the bottom plate of the steam dryer 30. Therefore, the soaring of sludge when the water level of the permanganic acid aqueous solution rises from the water level WL1 to the water level WL2 is extremely small as compared with the soaring of sludge in the process of step S9 (rise of the water level of the oxalic acid aqueous solution) described later.

As the water level of the permanganic acid aqueous solution rises, the surface of each component of the steam dryer 30 described above that comes into contact with the permanganic acid aqueous solution is oxidatively decontaminated by the permanganic acid aqueous solution. When the water level of the permanganic acid aqueous solution rises, an upward flow of the permanganic acid aqueous solution from below the lower end of the steam dryer 30 toward the inside of the steam dryer 30 is generated in the RPV 3. If the water level of the permanganic acid aqueous solution is lower than the lower end of the steam dryer 30 even when the water level rises, as described in the process of step S2, the permanganic acid aqueous solution discharged from the gas-water separator 29 flows in the region formed between the lower end of the steam dryer 30 and the upper ends of the plurality of gas-water separators 29 toward the inner surface of the RPV 3, descends along the inner surface of the skirt, and is guided to the downcomer 27, without flowing into the steam dryer 30. At this time, the permanganic acid aqueous solution circulates in the closed loop including the region in the RPV 3 and the circulation pipe 33. The permanganic acid aqueous solution fed from the main steam nozzle 20 into the RPV 3 through the circulation pipe 33 falls in the annular region formed between the inner surface of the RPV 3 and the cylindrical skirt and reaches the downcomer 27.

When the water level of the permanganic acid aqueous solution rises above the lower end of the steam dryer 30, most of the permanganic acid aqueous solution discharged from the gas-water separator 29 flows in the region formed between the lower end of the steam dryer 30 and the upper ends of the plurality of gas-water separators 29, and between the gas-water separators 29 toward the inner surface of the RPV 3, descends along the inner surface of the skirt, and is guided to the downcomer 27. Further, a part of the permanganic acid aqueous solution discharged from the gas-water separator 29 further rises and flows into the steam dryer 30. That is, a part of the permanganic acid aqueous solution rises in the flow path formed between the hood plate 92 and the rectifying plate 96 in the steam dryer 30 and reaches the inside of the steam flow path 95. The permanganic acid aqueous solution flows in the steam flow path 95 and is discharged to the flow path formed between the rectifying plate 99 and the hood plate 92. The permanganic acid aqueous solution that has risen in the flow path between the rectifying plate 99 and the hood plate 92 merges with the permanganic acid aqueous solution fed from the circulation pipe 33 through the main steam nozzle 20 into the RPV 3, descends the annular region formed between the inner surface of the RPV 3 and the cylindrical skirt, and reaches the downcomer 27. In the downcomer 27, the permanganic acid aqueous solution descending the annular region formed between the inner surface of the RPV 3 and the cylindrical skirt merges with the permanganic acid aqueous solution that has passed through the region between the lower end of the steam dryer 30 and the upper ends of the plurality of gas-water separators 29, and between the gas-water separator 29.

The flow of the permanganic acid aqueous solution in the RPV 3 described above occurs even when the water level of the permanganic acid aqueous solution in the RPV 3 is raised to the water level WL2 and held at the water level WL2.

By raising the water level of the permanganic acid aqueous solution to a position above the upper end of the steam dryer 30, oxidation decontamination of the surface of each component of the steam dryer 30 is effectively performed.

Oxidation decontamination is performed (step S5). In the state where the water level of the permanganic acid aqueous solution in the RPV 3 is held at the water level WL2, the permanganic acid aqueous solution containing permanganic acid at the second set concentration at 90° C. circulates in the closed loop including the internal region in the RPV 3 and the circulation pipe 33, and in the recirculation system pipe 6, and further, by driving the temporary pump 7A, the permanganic acid aqueous solution in the RPV 3 circulates in the downcomer 27, the recirculation system pipe 6, the reactor core shroud 28 in which the fuel assembly does not exist, the gas-water separator 29, and the downcomer 27.

Therefore, oxidation decontamination is performed on the inner surface of the RPV 3, the steam dryer 30, and the surfaces of the reactor internal structures other than the steam dryer 30 in the RPV 3 that come into contact with the permanganic acid aqueous solution.

That is, after the water level of the permanganic acid aqueous solution reaches a position above the upper end of the steam dryer 30 (for example, the position of the water level WL2) and the feed of demineralized water into the RPV 3 is stopped, the permanganic acid aqueous solution containing permanganic acid at the second set concentration is guided into the circulation pipe 33 of the chemical decontamination device 32 from a region below the reactor core 4 in the RPV 3 (hereinafter referred to as lower plenum) through each of the CRD housing 22, the ICM housing 23, and the drain pipe 26. The permanganic acid aqueous solution in the circulation pipe 33 is fed to the RPV 3 from the circulation pipe 33 through the main steam nozzle 20. The permanganic acid aqueous solution fed into the RPV 3 descends in the annular region formed between the inner surface of the RPV 3 and the cylindrical skirt to reach the downcomer 27.

Since the water level of the permanganic acid aqueous solution in the RPV 3 is maintained at the water level WL2 during the oxidation decontamination, as in step S4 described above, most of the permanganic acid aqueous solution that has been raised in the reactor core shroud 28 and the gas-water separator 29 by driving the temporary pump 7A flows in the region formed between the lower end of the steam dryer 30 and the upper ends of the plurality of gas-water separators 29, and between the gas-water separators 29 toward the inner surface of the RPV 3, descends along the inner surface of the skirt, and is guided to the downcomer 27. Further, a part of the raised permanganic acid aqueous solution flows in the steam flow path 95 of the steam dryer 30 as described above, rises in the flow path formed between the rectifying plate 99 and the hood plate 92, and merges with the permanganic acid aqueous solution fed into the RPV 3 from the circulation pipe 33. The merged permanganic acid aqueous solution descends in the annular region formed between the inner surface of the RPV 3 and the cylindrical skirt to reach the downcomer 27.

The permanganic acid aqueous solution merged in the downcomer 27 is boosted by the driven temporary pump 7A and reaches the lower plenum below the reactor core 4 via the jet pump 5. As described above, a part of the permanganic acid aqueous solution that has reached the lower plenum is returned to the circulation pipe 33 through each of the CRD housing 22, the ICM housing 23, and the drain pipe 26. The remaining permanganic acid aqueous solution that has reached the lower plenum rises in the reactor core shroud 28, reaches the gas-water separator 29, and eventually flows into the downcomer 27 as described above.

In the oxidation decontamination process of step S5 in which the permanganic acid aqueous solution in the RPV 3 is maintained at the water level WL2, oxidation decontamination is performed on the inside of the steam dryer 30 by a part of the permanganic acid aqueous solution rising in the reactor core shroud 28 and the gas-water separator 29. At the same time, oxidation decontamination is performed on the inner surfaces of the reactor core shroud 28 and the gas-water separator 29 by the permanganic acid aqueous solution rising in the reactor core shroud 28 and the gas-water separator 29. Oxidation decontamination is performed on the outer surface of the gas-water separator 29 and the inner surface of the cylindrical skirt by the permanganic acid aqueous solution flowing in the region formed between the lower end of the steam dryer 30 and the upper ends of the plurality of gas-water separators 29 and between the gas-water separators 29 toward the inner surface of the RPV 3. Oxidation decontamination is performed on the inner surface of the RPV 3 and the outer surface of the reactor core shroud 28 by the permanganic acid aqueous solution descending in the downcomer 27, and oxidation decontamination of the inner surface of the recirculation system pipe 6 is also performed. Further, oxidation decontamination of the inner surface of the main steam nozzle 20, the outer surface of the skirt, the inner surface of the RPV 3 facing the inner surface of the skirt, the CRD housing 22, the ICM housing 23, and the like is performed by the permanganic acid aqueous solution circulating in the closed loop including the inner region of the RPV 3 and the circulation pipe 33. As a result, the chromium oxide contained in the oxide film formed on the inner surface of the RPV 3 and the surface of each reactor internal structure in the RPV 3, including the steam dryer 30, which are in contact with the permanganic acid aqueous solution, is removed.

By performing oxidation decontamination using the permanganic acid aqueous solution, the oxide film containing radionuclides formed on the surface of the steam dryer 30 or the like that comes into contact with the permanganic acid aqueous solution is slightly dissolved. A small amount of sludge containing radionuclides generated by the dissolution of the oxide film is deposited on the upper surface of the bottom plate of the steam dryer 30.

When a predetermined time has elapsed from the start of oxidation decontamination of the inner surface of the RPV 3, the structures in the RPV 3 (including the steam dryer 30), and the recirculation system pipe 6, the oxidation decontamination of these is completed.

The oxidation decontamination agent contained in the oxidation decontamination solution is decomposed (step S6). During the temperature rise of water in the process of step S2, the valve 84 provided in the pipe 83 is opened, and the water flowing in the circulation pipe 33 is fed into the surge tank 53. When the water level in the surge tank 53 reaches a predetermined water level, the valve 84 is closed, and the feed of water into the surge tank 53 by the pipe 83 is stopped. By the time the process of step S6 is started, water at a predetermined water level is already stored in the surge tank 53. The water in the surge tank 53 is heated by the heater 60 and held at 90° C.

Oxalic acid (reduction decontamination agent) used for reduction decontamination of the surface of the steam dryer 30 and the like is fed as a decomposition agent for permanganic acid from the hopper 87A provided at the top of the surge tank 53 to the water at 90° C. in the surge tank 53. An excess amount (first predetermined amount) of oxalic acid, which is larger than the necessary amount for decomposing all of the permanganic acid contained in the permanganic acid aqueous solution existing in the closed loop including the circulation pipe 33 and the internal region of the RPV 3 is fed from the hopper 87A into the surge tank 53. The fed oxalic acid dissolves in the water at 90° C. in the surge tank 53, and an oxalic acid aqueous solution is generated in the surge tank 53.

The valve 85 is opened and the pump 61 is driven. The oxalic acid aqueous solution in the surge tank 53 is fed to the permanganic acid aqueous solution flowing in the circulation pipe 33 through the pipe 83. The permanganic acid aqueous solution containing oxalic acid is fed into the RPV 3 from the main steam nozzle 20. The permanganic acid aqueous solution containing oxalic acid fed into the RPV 3 falls in the annular region formed between the inner surface of the RPV 3 and the cylindrical skirt to reach the downcomer 27. Since the temporary pump 7A is being driven, the injected oxalic acid and the permanganic acid aqueous solution existing in the RPV 3 are agitated in the same manner as the agitation of the permanganic acid aqueous solution in the process of step S3. The oxalic acid decomposes the permanganic acid contained in the permanganic acid aqueous solution in the RPV 3, the recirculation system pipe 6, and the circulation pipe 33, and the decomposition of the permanganic acid is promoted by agitating the oxalic acid and the permanganic acid aqueous solution.

With the decomposition of permanganic acid, the permanganic acid aqueous solution changes from purple to colorless and transparent. When it is confirmed that the permanganic acid aqueous solution returned from the RPV 3 to the circulation pipe 33 has changed from purple to colorless and transparent, the process of decomposing the oxidation decontamination agent, that is, the permanganic acid contained in the permanganic acid aqueous solution is completed. When the permanganic acid aqueous solution becomes colorless and transparent, the pump 61 is stopped, the valve 41 is opened, the valves 84 and 85 are closed, and the injection of the oxalic acid aqueous solution into the circulation pipe 33 is stopped. When the permanganic acid aqueous solution becomes colorless and transparent, the liquid flowing in the circulation pipe 33 is an oxalic acid aqueous solution. When decomposing permanganic acid contained in the permanganic acid aqueous solution, oxalic acid is excessively fed to the permanganic acid aqueous solution. Therefore, when the permanganic acid is decomposed by oxalic acid and the permanganic acid aqueous solution becomes colorless and transparent, that is, when the permanganic acid is completely decomposed, the permanganic acid aqueous solution becomes an oxalic acid aqueous solution.

After decomposing the oxidation decontamination agent, the aqueous solution of the decomposition agent is cleaned and the water level in the RPV 3 is lowered (step S7). When the process of step S7 is started, the valves 70 and 71 are opened and the valve 36 is closed, and the valves 73 and 74 are opened and the valve 37 is closed. At the same time, the valves 79 and 80 are opened and the valve 39 is closed. While the circulation pump 35 is being driven, the oxalic acid aqueous solution (aqueous solution of the decomposition agent) fed from the lower plenum of the RPV 3 to the circulation pipe 33 is passed through the cooler 66 to be cooled, and the temperature becomes 60° C. or lower. In the cooler 66, for example, the oxalic acid aqueous solution cooled to 60° C. is fed to the mixed bed resin tower 65. The cations and anions contained in the oxalic acid aqueous solution flowing in the circulation pipe 33 are adsorbed on the cation exchange resin and the anion exchange resin in the mixed bed resin tower 65 and removed. Oxalate ions, which are anions, are also removed by the anion exchange resin. Since the oxalate ion (decomposition agent ion) contained in the oxalic acid aqueous solution fed to the mixed bed resin tower 65 is removed by the mixed bed resin tower 65, the liquid discharged from the mixed bed resin tower 65 is substantially water.

The water discharged from the mixed bed resin tower 65 is fed to the filter (solid content removing device) 63. The filter 63 removes solid contents contained in the water (for example, a part of sludge deposited on the upper surface of the bottom plate of the steam dryer 30). The water from which the solid contents have been removed and discharged from the filter 63 and meets the drainage standard is drained from the portion of the pipe 78 between the filter 63 and the valve 80 to the outside of the chemical decontamination device 32 and guided to the radioactive liquid waste treatment device (not shown). The water discharged from the filter 63 is not fed to the RPV 3.

Due to the drainage from the pipe 78 to the radioactive liquid waste treatment device, the water level in the RPV 3 is lowered from the water level WL2 to the water level WL1 located below the lower end of the steam dryer 30. As the water level in the RPV 3 is lowered, the sludge deposited on the upper surface of the bottom plate of the steam dryer 30 is removed from the upper surface, and discharged together with the water in the steam dryer 30 to the region formed between the lower end of the steam dryer 30 and the upper ends of the plurality of gas-water separators 29 through the drain line 31 provided in the steam dryer 30. Further, the water that has been raised in the reactor core shroud 28 and the gas-water separator 29 by the drive of the temporary pump 7A is discharged from the gas-water separator 29, flows toward the inner surface of the RPV 3 together with the sludge-containing water discharged from the steam dryer 30, and descends along the inner surface of the skirt to reach the downcomer 27. The sludge-containing water that has reached the downcomer 27 is guided into the circulation pipe 33 through the recirculation system pipe 6, the jet pump 5, and the lower plenum, and reaches the filter 63 as described above. When the water level of the oxalic acid aqueous solution in the RPV 3 is lowered to the water level WL1 located below the lower end of the steam dryer 30, the drain line 31 is exposed from the water surface in the RPV 3.

The water level in the RPV 3 lowered to below the lower end of the steam dryer 30 is a water level in the range below the lower end of the steam dryer 30 and above the shroud head in the RPV 3.

When the water level in the RPV 3 is lowered to the water level WL1, the valves 70 and 71 are opened and the valve 36 is closed, and the valves 73 and 74 are opened, and the valve 37 is closed. Therefore, the feed of the oxalic acid aqueous solution to the cooler 66 is stopped, and the cleanup of the oxalic acid aqueous solution by the mixed bed resin tower 65 is also stopped. That is, the cleanup of the oxalic acid aqueous solution by the mixed bed resin tower 65 is completed. At the same time, the valve 39 is opened, the valves 79 and 80 are closed, the feed of the water discharged from the mixed bed resin tower 65 to the filter 63 is stopped, and the drainage from the filter 63 to the radioactive liquid waste treatment device is stopped.

In the process of step S7, only the oxalic acid aqueous solution discharged from the RPV 3 to the circulation pipe 33 in order to lower the water level of the oxalic acid aqueous solution in the RPV 3 from the water level WL2 to the water level WL1 in the oxalic acid aqueous solution (decomposition agent aqueous solution) in the RPV 3 is cleaned up in the mixed bed resin tower 65. Therefore, the liquid existing in the RPV 3 below the position of the water level WL1 at the end of the process of step S7 is an oxalic acid aqueous solution. Since the oxalic acid contained in this oxalic acid aqueous solution can be used as a reduction decontamination agent in the reduction decontamination process of step S10 described later, the amount of the reduction decontamination agent to be injected into the RPV 3 in the injection process of the reduction decontamination agent in the next step S8, that is, the amount of oxalic acid can be reduced. Further, in the process of step S7, the amount of the ion exchange resin used in the mixed bed resin tower 65 for cleaning the oxalic acid aqueous solution (decomposition agent aqueous solution) can be reduced.

A reduction decontamination agent is injected (step S8). After the process of step S7 is completed, the valves 73 and 74 are opened and the valve 37 is closed. The oxalic acid aqueous solution flowing in the circulation pipe 33 is fed to the cation exchange resin tower 64. Similar to the process of step S7, the valve 85 is opened and the pump 61 is driven. The oxalic acid aqueous solution remaining in the surge tank 53, which has a higher oxalic acid concentration than the oxalic acid aqueous solution fed from the RPV 3 to the circulation pipe 33, is fed to the oxalic acid aqueous solution flowing in the circulation pipe 33 through the pipe 83. The oxalic acid aqueous solution flowing in the circulation pipe 33 is heated by the heater 62, and the temperature rises to 90° C. Since the circulation pump 35 is being driven, the oxalic acid aqueous solution at 90° C. fed from the surge tank 53 is fed into the RPV 3 from the main steam nozzle 20 through the circulation pipe 33. The temperature of the oxalic acid aqueous solution in the RPV 3 will soon reach 90° C.

As shown in FIG. 9, the oxalic acid aqueous solution is injected from the surge tank 53 to the circulation pipe 33 in a state where the water level of the oxalic acid aqueous solution in the RPV 3 is the water level WL1 below the lower end of the steam dryer 30, so that the oxalic acid concentration in the oxalic acid aqueous solution in the RPV 3 is the set concentration (a fourth set concentration described later) in a state where the water level of the oxalic acid aqueous solution in the RPV 3 has risen to the water level WL2 above the upper end of the steam dryer 30.

The set concentration of oxalic acid in the oxalic acid aqueous solution in the RPV 3 (hereinafter referred to as a third set concentration) in a state where the water level of the oxalic acid aqueous solution is the water level WL1 lower than the lower end of the steam dryer 30 is higher than the set concentration of oxalic acid in the oxalic acid aqueous solution in the RPV 3 (hereinafter referred to as the fourth set concentration) in a state where the water level of the aqueous solution is the water level WL2 above the upper end of the steam dryer 30. In a state where the water level of the oxalic acid aqueous solution in the RPV 3 is the water level WL1, a predetermined amount of the oxalic acid aqueous solution is fed from the surge tank 53 to the RPV 3 through the circulation pipe 33. When the concentration of the oxalic acid in the oxalic acid aqueous solution in the RPV 3 reaches the third set concentration, the drive of the pump 61 is stopped, the valve 85 is closed, and the feed of the oxalic acid aqueous solution from the surge tank 53 to the circulation pipe 33 is stopped.

After the injection of the oxalic acid aqueous solution from the surge tank 53 to the circulation pipe 33 is stopped, the valve 46 is opened and the injection pump 45 is driven in the pH adjustment agent injection device 43. An aqueous solution of hydrazine, which is a pH adjustment agent in the chemical solution tank 44, is injected into the circulation pipe 33 through the injection pipe 47. By injecting this hydrazine aqueous solution, the pH of the oxalic acid aqueous solution flowing in the circulation pipe 33 is adjusted to 2.5. The pH of the oxalic acid aqueous solution is adjusted by opening the valves 67 and 68, guiding a part of the oxalic acid aqueous solution in the circulation pipe 33 to the pipe 66A, and measuring the pH of the oxalic acid aqueous solution with a pH meter 77. That is, the rotation speed of the injection pump 45 (or the opening degree of the valve 46) is controlled based on the pH value of the oxalic acid aqueous solution measured by the pH meter 77, and the pH of the oxalic acid aqueous solution is adjusted by adjusting the amount of the hydrazine aqueous solution injected from the chemical solution tank 44 into the circulation pipe 33.

As the reduction decontamination agent, at least one of oxalic acid, malonic acid, formic acid, and ascorbic acid is used.

Since the flow velocity of the chemical decontamination aqueous solution (for example, permanganic acid aqueous solution or oxalic acid aqueous solution) is high in the circulation pipe 33, when the pH meter 77 is installed in the circulation pipe 33, the pH of the chemical decontamination aqueous solution becomes impossible to be accurately measured. In this embodiment, the pH meter 77 is installed in the pipe 66A that bypasses the circulation pump 35, which can be adjusted to the set flow rate corresponding to the pH meter 77. The flow rate of the chemical decontamination aqueous solution flowing through the pipe 66A is adjusted by controlling the opening degree of the valve 67 (or valve 68). By installing the pH meter 77 in the pipe 66A in this way, the pH of the chemical decontamination aqueous solution flowing in the circulation pipe 33 can be measured with high accuracy.

An oxalic acid aqueous solution at a pH of 2.5 and 90° C. circulates in the closed loop including a region in the RPV 3 and the circulation pipe 33. The oxalic acid aqueous solution fed from the circulation pipe 33 through the main steam nozzle 20 into the RPV 3 falls in the annular region formed between the inner surface of the RPV 3 and the cylindrical skirt and reaches the downcomer 27. Even when the oxalic acid aqueous solution is fed to the RPV 3 from the circulation pipe 33, the temporary pump 7A is driven and the oxalic acid aqueous solution in the RPV 3 circulates in the downcomer 27, the recirculation system pipe 6, the reactor core shroud 28 in which the fuel assembly does not exist, the gas-water separator 29, and the downcomer 27 to agitate the oxalic acid aqueous solution in the RPV 3 so that the concentration of oxalic acid in the oxalic acid aqueous solution in the RPV 3 becomes uniform, as in the case where the permanganic acid aqueous solution is fed to the RPV 3 in step S3. When the water level of the oxalic acid aqueous solution in the RPV 3 is the water level WL1, the oxalic acid aqueous solution raised in the reactor core shroud 28, and the gas-water separator 29 flows in the region formed between the lower end of the steam dryer 30 and the upper ends of the plurality of gas-water separators 29, and between the gas-water separators 29 toward the inner surface of the RPV 3, descends along the inner surface of the skirt, and is guided to the downcomer 27.

The water level of the reduction decontamination solution is raised (step S9). After the injection of the oxalic acid aqueous solution into the RPV 3 is stopped, the demineralized water is fed into the RPV 3 from the above-mentioned reactor auxiliary cooling water. By feeding the demineralized water, the water level of the oxalic acid aqueous solution in the RPV 3 rises from the water level WL1 to the water level WL2 located above the upper end of the steam dryer 30. The water level WL2 of the oxalic acid aqueous solution is a water level within a range above the upper end of the steam dryer 30 and at or below the lower surface of the blanket 110 in contact with the top of the hanger 109 attached to the upper end of the steam dryer 30. As the water level of the oxalic acid aqueous solution rises, reduction decontamination of the surface of each component of the steam dryer 30 in contact with the oxalic acid aqueous solution is performed by the oxalic acid aqueous solution. When the water level of the oxalic acid aqueous solution rises to the water level WL2 located above the upper end of the steam dryer 30, the feed of demineralized water into the RPV 3 is stopped. At this time, the oxalic acid concentration of the oxalic acid aqueous solution in the RPV 3 becomes the fourth set concentration.

When the water level of the oxalic acid aqueous solution rises, the flow of the oxalic acid aqueous solution in the RPV 3 is the same as the flow of the permanganic acid aqueous solution in the RPV 3 described in the process of step S4. When the water level of the oxalic acid aqueous solution is lower than the lower end of the steam dryer 30 in the rise of the water level of the oxalic acid aqueous solution, the oxalic acid aqueous solution that has risen in the gas-water separator 29 and has been discharged from the gas-water separator 29 descends along the inner surface of the skirt through a region between the lower end of the dryer 30 and the upper ends of the plurality of gas-water separators 29 and is guided to the downcomer 27. Further, the oxalic acid aqueous solution fed from the circulation pipe 33 through the main steam nozzle 20 into the RPV 3 falls in the annular region formed between the inner surface of the RPV 3 and the cylindrical skirt and flows into the downcomer 27.

When the water level of the oxalic acid aqueous solution rises above the lower end of the steam dryer 30, most of the flow of the oxalic acid aqueous solution discharged from the gas-water separator 29 is the same as most of the flow of the permanganic acid aqueous solution when the water level of the permanganic acid aqueous solution rises above the lower end of the steam dryer 30 in the process of step S4. Further, a part of the oxalic acid aqueous solution discharged from the gas-water separator 29 passes through the steam flow path 95 of the steam dryer 30, and the flow path formed between the rectifying plate 99 and the hood plate 92, and merges with the oxalic acid aqueous solution fed into the RPV 3 from the main steam nozzle 20. The merged oxalic acid aqueous solution descends in the annular region formed between the inner surface of the RPV 3 and the cylindrical skirt and reaches the downcomer 27.

As the water level of the oxalic acid aqueous solution in the RPV 3 rises, the water level of the oxalic acid aqueous solution also rises in the steam dryer 30, and the area of the surface of each component of the steam dryer 30 described above in contact with the oxalic acid aqueous solution increases. Therefore, as the water level of the oxalic acid solution rises, the region where the reduction decontamination is performed on each component of the steam dryer 30 is expanded upward. Further, as the water level of the oxalic acid solution in the RPV 3 rises above the upper surface of the bottom plate of the steam dryer 30, a part of the sludge containing radioactive substances deposited on the upper surface of the bottom plate of the steam dryer 30 soars upward. When the water level of the oxalic acid aqueous solution rises to WL2, the sludge that has soared upward is discharged from the steam dryer 30 together with the oxalic acid aqueous solution flowing in the steam flow path 95 of the steam dryer 30. The oxalic acid aqueous solution containing the sludge merges with the oxalic acid aqueous solution fed into the RPV 3 from the main steam nozzle 20 and descends in the annular region formed between the inner surface of the RPV 3 and the cylindrical skirt to reach the downcomer 27. The temporary pump 7A is still driven even when the water level of the oxalic acid aqueous solution rises.

The valves 79 and 80 are opened and the valve 39 is closed. The oxalic acid aqueous solution containing sludge flows into the circulation pipe 33 from the lower plenum in the RPV 3, and is guided to the filter 63 through the pipe 78. The sludge contained in the oxalic acid aqueous solution is removed by the filter 63. At this time, the valve (not shown) provided in the pipe (not shown) connecting the portion of the pipe 78 between the filter 63 and the valve 80, and the above-mentioned radioactive liquid waste treatment device is closed. Therefore, the oxalic acid aqueous solution from which sludge has been removed by the filter 63 is returned to the circulation pipe 33 through the pipe 78 without being guided from the pipe 78 to the radioactive waste liquid treatment device and fed to the RPV 3.

Reduction decontamination is performed (step S10). An oxalic acid aqueous solution containing oxalic acid having the fourth set concentration at pH 2.5 and 90° C. circulates in a closed loop formed by the circulation pipe 33 and the RPV 3, and further flows in the recirculation system pipe 6, the jet pump 5, the lower plenum, the reactor core shroud 28, and the gas-water separator 29 by driving the temporary pump 7A. Therefore, reduction decontamination is performed on the surface of the inner surface of the RPV 3, and each reactor internal structure in the RPV 3 in contact with the oxalic acid aqueous solution, including the steam dryer 30. This oxalic acid aqueous solution dissolves an oxide film containing radionuclides formed on the inner surface of the RPV 3 and the surfaces of the reactor internal structures. By dissolving the oxide film, the radionuclides and iron contained in the oxide film become ions and elute into the oxalic acid aqueous solution. By dissolving the oxide film, the remaining solid residue, that is, sludge, is separated into the oxalic acid aqueous solution from the oxide film formed on the surface of each reactor internal structure in the RPV 3. In this way, sludge is produced by dissolving the oxide film.

That is, after the water level of the oxalic acid aqueous solution reaches the water level WL2 above the upper end of the steam dryer 30 and the rise of the water level of the oxalic acid aqueous solution is completed, the oxalic acid aqueous solution containing oxalic acid at the fourth set concentration in the RPV 3 is guided into the circulation pipe 33 from the lower plenum in the RPV 3. Further, the oxalic acid aqueous solution is fed to the RPV 3 from the circulation pipe 33 through the main steam nozzle 20. The oxalic acid aqueous solution fed into the RPV 3 descends the annular region formed between the inner surface of the RPV 3 and the cylindrical skirt, and flows into the downcomer 27.

During the reduction decontamination, most of the oxalic acid aqueous solution that has risen in the reactor core shroud 28 and the gas-water separator 29 by the drive of the temporary pump 7A flows in the region between the lower end of the steam dryer 30 and the upper ends of the plurality of gas-water separators 29 and between the gas-water separators 29, descends along the inner surface of the skirt, and is guided to the downcomer 27. As described above, a part of the raised oxalic acid aqueous solution flows in the steam flow path 95 of the steam dryer 30, rises in the flow path formed between the rectifying plate 99 and the hood plate 92, and merges with the oxalic acid aqueous solution fed from the circulation pipe 33 into RPV 3. The merged permanganic acid aqueous solution descends in the annular region formed between the inner surface of the RPV 3 and the cylindrical skirt to reach the downcomer 27.

By such a flow of the oxalic acid aqueous solution, reduction decontamination of the surface of each component (corrugated plate 93, side wall 98, etc.) of the steam dryer 30 in contact with the oxalic acid aqueous solution is performed. In the reduction decontamination of the surface of each component of the steam dryer 30, sludge generated by the dissolution of the oxide film formed on the surface is deposited on the upper surface of the bottom plate of the steam dryer 30.

Since the temporary pump 7A is being driven while the reduction decontamination is performed, the oxalic acid aqueous solution in the downcomer 27 reaches the lower plenum via the recirculation system pipe 6 and the jet pump 5. A part of the oxalic acid aqueous solution in the lower plenum is guided into the circulation pipe 33 as described above. The remaining oxalic acid aqueous solution that has reached the lower plenum rises in the reactor core shroud 28 and the gas-water separator 29.

In the reduction decontamination process of step S10 in which the water level of the oxalic acid aqueous solution in the RPV 3 is held at the water level WL2, a part of the oxalic acid aqueous solution that rises in the reactor core shroud 28 and the gas-water separator 29 by driving the temporary pump 7A is guided into the steam dryer 30, and reduction decontamination in the steam dryer 30 is performed by the part of the oxalic acid aqueous solution, and at the same time, reduction decontamination is performed on the inner surfaces of the reactor core shroud 28 and the gas-water separator 29 and the inner surface of the cylindrical skirt by the oxalic acid aqueous solution rising in the reactor core shroud 28. With the oxalic acid aqueous solution descending the downcomer 27, the inner surface of the RPV 3 and the outer surface of reactor core shroud 28 are subjected to reduction decontamination, and the inner surface of the recirculation system pipe 6 is also subjected to reduction decontamination. Further, reduction decontamination is performed on the inner surface of the main steam nozzle 20, the outer surface of the skirt, the inner surface of the RPV 3 facing the inner surface of the skirt, the CRD housing 22 and the ICM housing 23, and the like by the oxalic acid aqueous solution circulating in the closed loop including the inner region of the RPV 3 and the circulation pipe 33. As a result, the oxide film formed on the inner surface of the RPV 3 and the surface of the RPV 3 in contact with the oxalic acid aqueous solution of each reactor internal structure including the steam dryer 30 is dissolved and removed.

With the dissolution of the oxide film, the radionuclide concentration and Fe concentration in the oxalic acid aqueous solution increase. When the process of step S10 is performed, the valves 76 and 77A are opened and the valve 38 is closed, and the oxalic acid aqueous solution flowing through the circulation pipe 33 is fed to the cation exchange resin tower 64. Metal cations such as radionuclides and Fe contained in the oxalic acid aqueous solution are adsorbed and removed by the cation exchange resin in the cation exchange resin tower 64. The oxalic acid aqueous solution discharged from the cation exchange resin tower 64 is fed again to the RPV 3 from the circulation pipe 33, and is used for the reduction decontamination of the RPV 3 and the reactor internal structures (including the steam dryer 30) in the RPV 3.

When the surface dose rate obtained based on the detection signal output from the radiation detector (not shown) installed to grasp the decontamination status of the RPV 3 including the steam dryer 30 has decreased to the set dose rate or less, the reduction decontamination of the RPV 3 including the steam dryer 30 is completed. Further, the reduction decontamination of the RPV 3 including the steam dryer 30 may be completed when a predetermined time has elapsed from the start of the reduction decontamination in the process of step S10.

The reduction decontamination agent and the pH adjustment agent contained in the reduction decontamination solution are decomposed, and the water after the decomposition of the reduction decontamination agent and the pH adjustment agent is cleaned up (step S11). The decomposition of oxalic acid, which is a reduction decontamination agent, and hydrazine, which is a pH adjustment agent, contained in the oxalic acid aqueous solution is performed as follows. The valve 82 is opened to partially reduce the opening degree of the valve 40. A part of the oxalic acid aqueous solution containing hydrazine flowing in the circulation pipe 33 is fed to the decomposition device 59 by the pipe 81 through the valve 82. At this time, in the oxidant injection device 54, the hydrogen peroxide in the chemical solution tank 55 is fed to the decomposition device 59 through the feed pipe 58 and the pipe 81 by opening the valve 57 and driving the feed pump 56. The oxalic acid and hydrazine contained in the oxalic acid aqueous solution are decomposed in the decomposition device 59 by the action of the activated carbon catalyst existing in the decomposition device 59 and the hydrogen peroxide fed from the chemical solution tank 55. The decomposition reaction of oxalic acid and hydrazine in the decomposition device 59 is represented by the formulas (1) and (2).

$$(COOH)_2 + H_2O_2 \rightarrow 2CO_2 + 2H_2O \tag{1}$$

$$N_2H_4 + 2H_2O_2 \rightarrow N_2 + 4H_2O \tag{2}$$

The decomposition of oxalic acid and hydrazine in the decomposition device 59 is performed while circulating the oxalic acid aqueous solution in the closed loop including the internal region of the RPV 3 and the circulation pipe 33. The amount of hydrogen peroxide fed from the chemical solution tank 55 to the decomposition device 59 is adjusted by controlling the rotation speed of the feed pump 56 so that the hydrogen peroxide fed to the decomposition device 59 is completely consumed by the decomposition device 59 for decomposition of oxalic acid and hydrazine and does not flow out from the decomposition device 59.

When the oxalic acid concentration in the oxalic acid aqueous solution falls below a predetermined value, the feed pump 56 is stopped, the valve 57 is closed, and the injection of hydrogen peroxide into the decomposition device 59 is stopped. For example, when the oxalic acid concentration of the oxalic acid aqueous solution becomes 30 ppm or less, the injection of hydrogen peroxide into the decomposition device 59 is stopped. The process of decomposing oxalic acid and hydrazine ends when the injection of hydrogen peroxide is stopped.

After that, the cleanup process of step S11 is performed in the same manner as the cleanup process performed in step S6. The oxalic acid aqueous solution flowing in the circulation pipe 33 is cooled to 60° C. or lower by the cooler 66. The cations and anions contained in the oxalic acid aqueous solution cooled to 60° C. are adsorbed on the cation exchange resin and the anion exchange resin in the mixed bed resin tower 65 and removed. When the decomposition process of the reduction decontamination agent in the process of step S11 is completed, an oxalic acid aqueous solution having an oxalic acid concentration of 30 ppm is fed to the mixed bed resin tower 65, and the oxalate ions contained in the oxalic acid aqueous solution are adsorbed on the anion exchange resin and removed. Therefore, when the cleanup process is completed, the liquid discharged from the mixed bed resin tower 65 has an oxalic acid concentration of substantially 0 and is substantially water. When this water meets the drainage standard, the water flow to the mixed bed resin tower 65 is stopped, and the cleanup of the water flowing in the circulation pipe 33 is completed.

The water level of the reduction decontamination solution is lowered (step S12). After the cleanup process of step S11 is completed, the water existing in the lower plenum in the RPV 3 is fed to the filter 63 through the circulation pipe 33 as in the process of step S7. The filter 63 removes solid contents (e.g., sludge, etc.) contained in the water. The water from which the solid content has been removed and discharged from the filter 63 is guided from the portion of the pipe 78 between the filter 63 and the valve 80 to the external radioactive waste liquid treatment device described above.

Due to such drainage from the pipe 78, the water level in the RPV 3 is lowered from the water level WL2 to a water level WL3 (see FIG. 10). By lowering the water level in the RPV 3 to the water level WL3 located below the lower end of the steam dryer 30, the entire drain line 31 provided in the steam dryer 30 is exposed from the water surface in the RPV 3. The water level in the RPV 3 lowered to below the lower end of the steam dryer 30 is a water level in the range below the lower end of the steam dryer 30 and above the shroud head in the RPV 3.

When the water level in the RPV 3 is lowered to the water level WL3, sludge (sediment) containing radioactive substances remaining on the upper surface of the bottom plate of the steam dryer 30 is discharged to the drain line 31 through a drain discharge hole formed in the bottom plate at the position of each drain pocket 94A together with the water flowing in the flow path 95. The sludge-containing water that has reached the drain line 31 is discharged from the drain line 31 to the region formed between the lower end of the steam dryer 30 and the upper end of the gas-water separator 29, and flows in the region and between the gas-water separators 29 toward the inner surface of the RPV 3. Eventually, the water containing the sludge descends along the inner surface of the skirt and flows into the downcomer 27.

Since the temporary pump 7A is being driven, the sludge-containing water in the downcomer 27 passes through the recirculation system pipe 6 and the jet pump 5, reaches the lower plenum of the RPV 3, and flows into the circulation pipe 33. Since the water is fed to the filter 63 through the circulation pipe 33, the sludge contained in the water is removed by the filter 63. When the water level in the RPV 3 is lowered to the water level WL3, the above-mentioned valve provided in the pipe (not shown) connecting the portion of the pipe 78 between the filter 63 and the valve 80 and the radioactive liquid waste treatment device is closed. Therefore, the water from which sludge has been removed by the filter 63 is fed to the RPV 3 through the circulation pipe 33.

By opening the valve 90 provided in the pipe 25 connected to the circulation pipe 33, a part of the water flowing in the circulation pipe 33 is fed to the head spray nozzle 24 through the pipe 25. This water is sprayed from the head spray nozzle 24 toward the upper end of the steam dryer 30 (see FIG. 10). When the water is sprayed from the head spray nozzle 24, the valve 89 is closed, and the feed of the water from the circulation pipe 33 to the RPV 3 through the main steam nozzle 20 is stopped. The water sprayed from the head spray nozzle 24 cleans the upper surface of the top plate 97 of the steam dryer 30 and the surface of the hood plate 92 facing the rectifying plate 99, and falls into the region between the rectifying plate 99 and the hood plate 92 of the steam dryer element 91 located adjacent to the rectifying plate 99. The sludge deposited on the bottom surface of the region between the rectifying plate 99 and its hood plate 92 is present in the bottom of the region between the rectifying plate 99 and its hood plate 92 by the water sprayed from the head spray nozzle 24 and having caused the sludge to fall into the region between the hood plate 92 and the rectifying plate 99. A part of the sludge deposited on the upper surface of the bottom plate of the steam dryer 30 is discharged below the lower end of the steam dryer 30 through a through-hole (not shown) formed in the bottom plate existing at the bottom of the region between the rectifying plate 99 and the hood plate 92. The remaining sludge existing on the upper surface of the bottom plate existing at the bottom of the region between the rectifying plate 99 and the hood plate 92 is swept away through each through-hole of the rectifying plate 99 toward the steam flow path 95 by the water sprayed from the head spray nozzle 24. A part of the sludge-containing water flowing in the steam flow path 95 is discharged to the drain line 31 through the drain discharge holes formed in the bottom plate at the positions of the drain pockets 94A. Therefore, as a part of the sludge-containing water is discharged to the drain line 31 through the drain discharge hole, the sludge remaining on the upper surface of the bottom plate of the steam dryer 30 is also discharged to the drain line 31, and the sludge deposited on the top surface of the bottom surface is removed. The remaining water containing the sludge, which flows through the steam flow path 95, reaches the flow path formed between the hood plate 92 and the rectifying plate 96 through the through-holes formed in the rectifying plate 96, and is guided to the downcomer 27 through the region between the lower end of the steam dryer 30 and the upper end of the gas-water separator 29.

The end of chemical decontamination is determined (step S13). If the surface dose rate obtained based on the output signal of the radiation detector has not been reduced to the set dose rate even if the elapsed time from the start of reduction decontamination reached the set time, respective processes of steps S3 to S13 are repeated. The set dose rate is set from the decontamination coefficient (DF) (dose rate before decontamination/dose rate after decontamination), and the number of repetitions of each process from steps S3 to S13 is 2 to 3 times.

When the determination in step S13 is "NO" after the chemical decontamination in the first cycle (processes of steps S3 to S12) is completed, the chemical decontamination in the second cycle (processes of steps S3 to S12) is performed. When the sludge deposited on the upper surface of the bottom plate of the steam dryer 30 is not completely removed due to the lowering of the water level of the oxalic acid aqueous solution in the process of step S12 (water level processing of the reduction decontamination aqueous solution) in the first cycle of chemical decontamination, in the process of step S4 (rise of the water level of the oxidation decontamination aqueous solution) in the second cycle of chemical decontamination, the phenomenon that the sludge remaining on the upper surface of the bottom plate of the steam dryer 30 is soaring upward by the rise of the water level of the permanganic acid aqueous solution occurs. The sludge that has soared upward is guided to the filter 63 together with the permanganic acid aqueous solution and removed by the filter 63.

Even if the surface dose rate of the recirculation system pipe 6 has not decreased to the set dose rate as a result of repeated decontamination 2 to 3 times, the process of step S14 described later is performed when the surface dose rate has decreased to the background level.

All the water in the PRV 3 is discharged (step S14). When each process of steps S1 to S13 is performed and the determination in step S13 becomes "YES", the valve 79 is opened and the valve 39 is closed. The valve 80 remains closed. Since the circulation pump 35 is being driven, the water in the RPV 3 and the water in the circulation pipe 33 on the upstream side of the valve 39 are fed to the filter 63, and the solid content contained in the water is removed by the filter 63. The water that has passed through the filter 63 is discharged from the portion of the pipe 78 between the filter 63 and the valve 80 to the radioactive liquid waste treatment device. The drainage to the radioactive liquid waste treatment device is performed until all the water in the RPV 3 and all the water in the circulation pipe 33 on the upstream side of the valve 39 are discharged to the radioactive liquid waste treatment device. After that, in the state where the valves 38, 77A, and 80 are closed, the valve 39 is opened, and the water existing in the circulation pipe 33 is fed to the filter 63 on the downstream side of the circulation pipe 33 with respect to the valve 39, whereby the solid content contained in this water is also removed by the filter 63. The water that has passed through the filter 63 is also discharged to the radioactive liquid waste treatment device.

The chemical decontamination device is removed from the decontamination target (step S15). After the discharge of all the water in the RPV 3 and the circulation pipe 33 is completed, the chemical decontamination device 32 is removed from the RPV 3. When the connecting jig is removed from each of the CRD housing 22 and each ICM housing 23 in order to remove the chemical decontamination device 32 from the RPV 3 after all the water in the RPV 3 and the circulation pipe 33 has been discharged, the work of removing the connecting jig from each of the CRD housing 22 and the ICM housing 23 can be easily performed without causing water in the RPV 3 to flow out from each of the CRD housing 22 and the ICM housing 23.

This completes the chemical decontamination method of the present Embodiment.

As described above, in the decomposition process of the oxidation decontamination agent in the process of step S6 described above, the oxidation decontamination agent (for example, permanganic acid) contained in the oxidation decontamination aqueous solution (for example, permanganic acid aqueous solution) is decomposed by a decomposition agent (for example, oxalic acid), and the oxidation decontamination aqueous solution becomes substantially a decomposition agent aqueous solution containing the decomposition agent (for example, an oxalic acid aqueous solution). Then, in the cleanup and water level lowering process of step S7, the cations and anions contained in the decomposition agent aqueous solution discharged from the RPV 3 in order to lower the water level WL2 to the water level WL1 are removed by the mixed bed resin tower 65. Therefore, the liquid remaining in the RPV 3 after the water level of the decomposition agent aqueous solution has been lowered in the process of step S7 is the decomposition agent aqueous solution. The decomposition agent aqueous solution corresponds to the oxidation decontamination aqueous solution because it is produced by decomposing the oxidation decontamination agent contained in the oxidation decontamination aqueous solution by the decomposition agent. Therefore, the lowering of the water level in the RPV 3 in the process of step S7 means the lowering of the water level of the oxidation decontamination aqueous solution in the RPV 3.

As described above, in the decomposition process of the reduction decontamination agent in the process of step S11 described above, the reduction decontamination agent (for example, oxalic acid) contained in the reduction decontamination aqueous solution (for example, oxalic acid aqueous solution) is decomposed to become a reduction decontamination aqueous solution containing a reduction decontamination agent of 30 ppm or less. In the cleanup process in the process of step S11, the cations and anions contained in the reduction decontamination aqueous solution are removed by the mixed bed resin tower 65, and substantial water is discharged from the mixed bed resin tower 65. Since the water produced by carrying out the decomposition process of the reduction decontamination agent and the cleanup process in step S11 corresponds to the reduction decontamination aqueous solution because it is generated from the reduction decontamination aqueous solution. Therefore, the lowering in the water level in the RPV 3 in the process of step S12 means the lowering in the water level of the reduction aqueous solution in the RPV 3.

The chemical decontamination method of the present Embodiment is the HOP method (using oxalic acid, permanganic acid, and hydrazine, Chemical decontamination method jointly developed by Hitachi-GE Nuclear Energy, Inc. and Kurita Engineering Co., Ltd.). In addition, chemical decontamination methods other than the above-mentioned chemical decontamination methods can also be applied to the present application. Other chemical decontamination methods include the CORD method (using oxalic acid and permanganic acid, including AREVA's chemical decontamination method, CORD-UV, CORD-D, etc.) and the T-OZON method (using oxalic acid and ozone water, Chemical decontamination method developed by Toshiba Corporation), LOMI method (using vanadium, formic acid, and picolinic acid. Chemical decontamination method developed by Electric Power Research Institute), CITRIX method (chemical decontamination method developed by Electric Power Research Institute), DfD method (boronic acid fluoride. Chemical decontamination method developed by Electric Power Research Institute), CAN-DECON (using ethylenediamine tetraacetic acid, oxalic acid, citric acid, nitrilotriacetic acid, and thioglycolic acid. Chemical decontamination method developed by Atomic Energy of Canada Limited), and CAN-DEREM (using citric acid, EDTA, oxalic acid, and formic acid. Chemical decontamination method developed by Atomic Energy of Canada Limited).

By lowering the water level of the chemical decontamination aqueous solution existing in the RPV 3 to the first water level below the lower end of the steam dryer 30, sludge containing radioactive substances deposited on the low plate of the steam dryer 30 can be discharged to the outside of the steam dryer 30 together with the chemical decontamination aqueous solution. Therefore, the decontamination efficiency of the steam dryer 30 by chemical decontamination can be improved, and the dose of the steam dryer 30 can be significantly reduced.

By raising the water level of the chemical decontamination aqueous solution in the RPV 3 to the second water level above the upper end of the steam dryer 30, sludge deposited on the low plate of the steam dryer 30 can be lifted and discharged to the outside of the steam dryer 30, the decontamination efficiency of the steam dryer 30 by chemical decontamination can be further improved. Further, by raising the water level of the chemical decontamination aqueous solution in the RPV 3 toward the upper end of the steam dryer 30, chemical decontamination can be performed on the surface up to the upper end of the steam dryer 30 that comes into contact with the chemical decontamination aqueous solution of the steam dryer 30.

By limiting the lowering in the water level of the chemical decontamination aqueous solution in the RPV 3 to a range below the lower end of the steam dryer 30 and above the shroud head attached to the upper end of the reactor core shroud 28, it is possible to reduce the amount of the chemical decontamination aqueous solution discharged from the RPV 3 when the water level is lowered. Therefore, the injection amount of the chemical decontamination agent to be injected into the RPV 3 after the water level of the chemical decontamination aqueous solution is lowered (for example, the reduction decontamination agent to be injected in the process of step S8, or the oxidation decontamination agent to be injected in the process of step S3 when the determination in step S13 is "No") can be reduced.

By limiting the rise in the water level of the chemical decontamination aqueous solution in the RPV 3 to the range above the upper end of the steam dryer 30 and at or below the position of the lower surface of the bracket 110 that presses the steam dryer 30 in the axial direction of the RPV 3, the amount of demineralized water fed into the RPV 3 for raising the water level can be reduced as compared with the case of raising the water level above the position of the lower surface of the bracket 110.

Embodiment 2

The chemical decontamination method of Embodiment 2, which is another suitable Embodiment of the present invention, will be described with reference to FIGS. 3, 12, and 13. The chemical decontamination method of the present Embodiment is applied to a BWR plant that is subject to decommissioning.

In the chemical decontamination method of the present Embodiment, each process of steps S1 to S4, S5A, S6, S8, S10A, S11, S13, and S14 shown in FIG. 12 is performed. Before the process of step S1 is performed, all of the fuel assemblies loaded in the reactor core 4 are transferred to the fuel storage pool as described above.

First, the chemical decontamination device is connected to the decontamination target in the state where the fuel assembly does not exist in the reactor core (step S1). In the process of step S1, one end portion of the circulation pipe 33 of the chemical decontamination device 32 is connected to the decontamination solution distribution pipe of the connecting jig attached to the flanges of the CRD housing 22 and the ICM housing 23 attached to the bottom of the RPV 3, as in the process of step S1 of Embodiment 1. Further, one end portion of the circulation pipe 33 is also connected to the drain pipe 26 connected to the bottom of the RPV 3. The other end portion of the circulation pipe 33 is connected to the main steam nozzle 20 of the RPV 3.

In the process of step S1, one end portion of a pipe 102 connected to a buffer tank 101 is connected to the circulation pipe 33 between the on-off valve 42 and the valve 95A provided in the circulation pipe 33 of the chemical decontamination device 32. The valve 95A is provided in the circulation pipe 33 upstream of the valve 89. The other end portion of the pipe 102 is connected to the pipe 25 between the head spray nozzle 24 and the valve 90. A valve 103 is installed in the pipe 102 between the buffer tank 101 and the circulation pipe 33, and the valve 104 is installed in the pipe 102 between the buffer tank 101 and the pipe 25. The buffer tank 101 is installed at a position higher than the RPV 3.

After the process of step S1 is completed, each process of steps S2 to S4 is performed in the same manner as in Embodiment 1. In the process of step S3 (injection of the oxidation decontamination agent), the oxidation decontamination agent (for example, the permanganic acid) is injected into the circulation pipe 33 in a state where the water level of the cooling water in the RPV 3 is located at the water level WL1 lower than the lower end of the steam dryer 30 (FIG. 4). At this time, the temporary pump 7A is being driven. In the process of step S4 (raising the water level of the oxidation decontamination solution), demineralized water is fed into the RPV 3 as in the process of step S4 of Embodiment 1. The water level of the permanganic acid aqueous solution in the RPV 3 is raised from the water level WL1 to the position of the water level WL2 (FIG. 9) higher than the upper end of the steam dryer 30. At this time, the permanganic acid contained in the permanganic acid aqueous solution has the second set concentration.

In the process of step S4 step of the present Embodiment, when the water level of the permanganic acid aqueous solution in the RPV 3 is raised to the position of the water level WL2, the flow of the permanganic acid aqueous solution similar to the process of step S4 in Embodiment 1 occurs in the RPV 3. When the water level of the permanganic acid aqueous solution is lower than the lower end of the steam dryer 30, the flow of the permanganic acid aqueous solution discharged from the gas-water separator 29 becomes, as in the process of step S4 of Embodiment 1, a flow toward the inner surface of the RPV 3 below the lower end of the steam dryer 30, and then a downward flow along the inner surface of the skirt to be guided to the downcomer 27. Further, the permanganic acid aqueous solution guided from the circulation pipe 33 through the main steam nozzle 20 into the RPV 3 falls in the annular region between the inner surface of the RPV 3 and the cylindrical skirt and reaches the downcomer 27.

Further, when the water level of the permanganic acid aqueous solution in the RPV 3 rises above the lower end of the steam dryer 30, the following flow of the permanganic acid aqueous solution occurs in addition to the flow of the permanganic acid aqueous solution in the RPV 3 when the water level in the permanganic acid aqueous solution described above is lower than the lower end of the steam dryer 30. Most of the permanganic acid aqueous solution discharged from the gas-water separator 29 becomes a flow toward the inner surface of the RPV 3 below the lower end of the steam dryer 30, and then a downward flow along the inner surface of the skirt to be guided to the downcomer 27.

Oxidation decontamination is performed to raise or lower the water level in the RPV (step S5A). Similar to the process of step S5 of Embodiment 1, in the state where the water level of the permanganic acid aqueous solution at 90° C. in the RPV 3, having a permanganic acid concentration of the second set concentration, is raised to the position above the upper end of the steam dryer 30 (for example, the position of the water level WL2 shown in FIG. 9) to become the water level WL2, the permanganic acid aqueous solution is circulated in the closed loop including the internal region of the RPV 3 and the circulation pipe 33. Since the temporary pump 7A is being driven, the permanganic acid aqueous solution circulates in the downcomer 27, the recirculation system pipe 6, the jet pump 5, the lower plenum, the reactor core shroud 28, and the downcomer 27.

Due to the flow of the permanganic acid aqueous solution, oxidation decontamination is performed on the inner surface of the RPV 3, the steam dryer 30, and the surface of the reactor internal structures other than the steam dryer 30 in the RPV 3, which come in contact with the permanganic acid aqueous solution, as in the process of step S5 of Embodiment 1. When such oxidation decontamination is performed, as described in the process of step S5 of Embodiment 1, by performing the oxidation decontamination using the permanganic acid aqueous solution, the oxide film containing the radionuclides formed on the surface in contact with the permanganic acid aqueous solution of the steam dryer 30 or the like is slightly dissolved. A small amount of sludge containing radionuclides generated by the dissolution of the oxide film is deposited on the upper surface of the bottom plate of the steam dryer 30.

Further, in the process of step S5A, the water level of the permanganic acid aqueous solution in the RPV 3 is raised or lowered to promote oxidation decontamination in the steam dryer 30. When lowering the water level of the permanganic acid aqueous solution in the RPV 3, the circulation of the permanganic acid aqueous solution is stopped in the closed loop including the internal region of the RPV 3 and the circulation pipe 33, and when the water level of the permanganic acid aqueous solution is raised, the permanganic acid aqueous solution circulates in the closed loop. When the water level of the permanganic acid aqueous solution is raised or lowered, the temporary pump 7A is being driven, and thus, the permanganic acid aqueous solution is circulated through the recirculation system pipe 6 as described above.

The lowering of the water level of the permanganic acid aqueous solution in the RPV 3 will be described in detail. At this time, the valve 103 is opened and the valve 95A is closed. Since the circulation pump 35 is being driven, the permanganic acid aqueous solution of the lower plenum in the RPV 3 flows into the circulation pipe 33 from the on-off valve 34 side, and is guided from the circulation pipe 33 through the pipe 102 into the buffer tank 101. The water level of the permanganic acid aqueous solution in the buffer tank 101 rises. When the permanganic acid aqueous solution is fed to the buffer tank 101, the valve 95A is closed, and thus, the feed of the permanganic acid aqueous solution to RPV 3 through the circulation pipe 33 is stopped. As the permanganic acid aqueous solution is transferred from the RPV 3 to the buffer tank 101, the water level of the permanganic acid aqueous solution in the RPV 3 is lowered. When the water level of the permanganic acid aqueous solution in the RPV 3 is lowered to the position of the water level WL3 (see FIG. 13) below the lower end of the steam dryer 30, the valve 95A is opened and the valve 103 is closed, while the circulation pump 35 is being driven.

By lowering the water level in the RPV 3 to the water level WL3, sludge slightly deposited on the upper surface of the bottom plate of the steam dryer 30 is removed from the upper surface and discharged to the region formed between the lower end of the steam dryer 30 and the upper ends of the plurality of gas-water separators 29 through the drain line 31 provided in the steam dryer 30. Then, the permanganic acid aqueous solution containing sludge is guided from the lower plenum in the RPV 3 to the filter 63 through the circulation pipe 33, as in the process of step S7 of the Embodiment 1. The permanganic acid aqueous solution from which sludge has been removed by the filter 63 is fed to the buffer tank 101.

The rise of the water level of the permanganic acid aqueous solution in the RPV 3 will be described in detail. After the water level of the permanganic acid aqueous solution in the RPV 3 is lowered to the position of the water level WL3, the valve 104 is opened while the circulation pump 35 is being driven. The permanganic acid aqueous solution in the buffer tank 101 is guided to the head spray nozzle 24 through the pipes 102 and 25 by the head pressure, and the water level of the permanganic acid aqueous solution in the buffer tank 101 is lowered. The permanganic acid aqueous solution is injected from the head spray nozzle 24 toward the upper end of the steam dryer 30 in the RPV 3. The injection of the permanganic acid aqueous solution raises the water level of the permanganic acid aqueous solution in the RPV 3. While the permanganic acid aqueous solution in the buffer tank 101 is being fed into the RPV 3, the valve 95A is opened to drive the circulation pump 35, and thus, the permanganic acid aqueous solution in the lower plenum of the RPV 3 is fed into the RPV 3 from the circulation pipe 33 through the main steam nozzle 20 and falls in the annular region formed between the inner surface of the RPV 3 and the cylindrical skirt to flow into the downcomer 27.

When the water level of the permanganic acid aqueous solution in the RPV 3 rises, the permanganic acid aqueous solution circulates in the closed loop including the internal region of the RPV 3 and the circulation pipe 33. When the water level of the permanganic acid aqueous solution in the RPV 3 has been raised to the water level WL2 shown in FIG. 9 due to the feed of the permanganic acid aqueous solution from the buffer tank 101 to the RPV 3, the valve 104 is closed and the feed of the permanganic acid aqueous solution from the buffer tank 101 to the RPV 3 is stopped. In step S5A of the present Embodiment, the water level of the permanganic acid aqueous solution is repeatedly lowered and raised between the water level WL2 and the water level WL3.

When the water level in the RPV 3 was raised to the water level WL2, dissolution of the oxide film, by the permanganic acid aqueous solution, containing radionuclides formed on the surface of the steam dryer 30 and the like that comes into contact with the permanganic acid aqueous solution as in the process of step S4 of Embodiment 1 hardly occurs. Therefore, sludge containing radionuclides is hardly generated due to the dissolution of the oxide film, and sludge is hardly deposited on the upper surface of the bottom plate of the steam dryer 30. However, when the water level of the above-mentioned permanganic acid aqueous solution is lowered, the sludge that has not been removed from the upper surface of the bottom plate of the steam dryer 30 and remains on the upper surface thereof rises from the upper surface. The permanganic acid aqueous solution containing the sludge that has soared upward flows in the steam flow path 95, rises in the flow path formed between the hood plate 92 and the rectifying plate 99, and is discharged to the outside of the steam dryer 30. The discharged permanganic acid aqueous solution containing sludge merges with the permanganic acid aqueous solution fed into the RPV 3 from the main steam nozzle 20, and descends in an annular region formed between the inner surface of the RPV 3 and the cylindrical skirt to reach the downcomer 27. Then, the permanganic acid aqueous solution containing sludge is guided from the lower plenum in the RPV 3 to the filter 63 through the circulation pipe 33, as in the process of step S9 of Embodiment 1. The permanganic acid aqueous solution from which sludge has been removed by the filter 63 is fed into the RPV 3 from the main steam nozzle 20 through the circulation pipe 33 in which the valve 95A is opened.

While the process of step S5A is performed, the permanganic acid in the permanganic acid aqueous solution is maintained at the second set concentration. In the process of step S5A, the circulation of the permanganic acid aqueous solution in the above-mentioned closed loop in a state where the water level of the permanganic acid aqueous solution is held at the water level WL2 in the RPV 3, the lowering of the water level of the permanganic acid aqueous solution in the RPV 3 from the water level WL2 to the water level WL3, and the rise of the water level of the permanganic acid aqueous solution in the RPV 3 from the water level WL3 to the water level WL2 are repeated to perform oxidation decontamination. In the process of step S5A, oxidation decontamination of the permanganic acid aqueous solution by circulation in the above-mentioned closed loop while the water level of the permanganic acid aqueous solution was held at the water level WL2 is performed for a predetermined time, and then the lowering of the water level of the permanganic acid aqueous solution from the water level WL2 to the water level WL3 and the rise of the water level of the permanganic acid aqueous solution in the RPV 3 from the water level WL3 to the water level WL2 may be repeated.

The oxidation decontamination agent contained in the oxidation decontamination solution is decomposed (step S6A). With the water level of the permanganic acid aqueous solution in the RPV 3 at the water level WL2 shown in FIG. 9, the valve 95A is opened to drive the circulation pump 35. The valve 89 is opened and the valve 90 is closed. By driving the circulation pump 35, the permanganic acid aqueous solution in the RPV 3 is circulated in the closed loop including the internal region of the RPV 3 and the circulation pipe 33. After the oxidation decontamination is completed, oxalic acid, which is a decomposition agent, is fed from the hopper 87A to the water stored in the surge tank 53 in the same manner as in the process of step S6 of Embodiment 1, and the oxalic acid aqueous solution (decomposition agent aqueous solution) is generated in the surge tank 53. With the valve 84 closed, the valve 85 is opened to drive the pump 61, and the oxalic acid aqueous solution is fed from the surge tank 53 through the pipe 83 into the circulation pipe 33 and the RPV 3. The oxalic acid (decomposition agent) contained in the fed oxalic acid aqueous solution decomposes the permanganic acid contained in the permanganic acid aqueous solution, and the permanganic acid aqueous solution becomes colorless and transparent. When the permanganic acid aqueous solution becomes colorless and transparent, the decomposition of the permanganic acid contained in the permanganic acid aqueous solution is completed.

In the present Embodiment, since the chemical decontamination aqueous solution (oxidation decontamination aqueous solution or reduction decontamination aqueous solution) in the RPV 3 is transferred to the buffer tank 101 to lower the water level of the chemical decontamination aqueous solution in the RPV 3, and the chemical decontamination aqueous solution in the buffer tank 101 is transferred into the RPV 3 to raise the water level of the chemical decontamination aqueous solution in the RPV 3, the cleanup process performed in step S6 of Embodiment 1 is not performed in the process of step S6A. In the present Embodiment, this cleanup process is performed only in the process of step S11 described later.

A reduction decontamination agent is injected (step S8). Unlike the process of step S8 in Embodiment 1, at the start of injection of the reduction decontamination agent in the present Embodiment, the water level of the oxalic acid aqueous solution in the RPV 3 having the oxalic acid concentration at the fourth set concentration becomes the water level WL2 shown in FIG. 9. Similar to Embodiment 1, since oxalic acid and hydrazine are injected, the oxalic acid aqueous solution having an oxalic acid concentration of the fourth set concentration at a pH of 2.5 and 90° C. is circulated in the closed loop including the internal region of the RPV 3 and the circulation pipe 33. Since the temporary pump 7A is being driven, the oxalic acid aqueous solution in the RPV 3 is agitated, and the oxalic acid concentration of the oxalic acid aqueous solution becomes uniform.

Reduction decontamination is performed to raise or lower the water level in the RPV (step S10A). Similar to the process of step S10 of Embodiment 1, in the state where the water level of the oxalic acid aqueous solution is above the upper end of the steam dryer 30 (for example, the position of the water level WL2 shown in FIG. 9) in the RPV 3, the oxalic acid aqueous solution is circulated in a closed loop including the internal region of the RPV 3 and the circulation pipe 33. The oxalic acid aqueous solution has an oxalic acid concentration of the fourth set concentration, a temperature of 90° C., and a pH of 2.5. Since the temporary pump 7A is being driven, the oxalic acid aqueous solution is circulated through the recirculation system pipe 6 as described above. By such a flow of the oxalic acid aqueous solution, reduction decontamination is performed on the inner surface of the RPV 3 and the surface of each reactor internal structure in the RPV 3 including the steam dryer 30, which are in contact with the oxalic acid aqueous solution. Therefore, the oxide film containing the radionuclides formed on the inner surface of the RPV 3, and the surface of each reactor internal structure of the RPV 3, including the steam dryer 30, in contact with the oxalic acid aqueous solution is dissolved and removed.

By dissolving the oxide film, metal cations such as the radionuclides and Fe contained in the oxalic acid aqueous solution are adsorbed and removed by the cation exchange resin in the cation exchange resin tower 64, as in Embodiment 1.

Further, in the process of step S10A, as in the step 5A, the water level of the oxalic acid aqueous solution in the RPV 3 is lowered to the water level WL3 (FIG. 13) below the lower end of the steam dryer 30 by transferring the oxalic acid aqueous solution in the RPV 3 to the buffer tank 101 and the water level of the oxalic acid aqueous solution in the RPV 3 is raised to the water level WL2 (FIG. 9) above the upper end of the steam dryer 30 by transferring the oxalic acid aqueous solution in the buffer tank 101 to the RPV 3. The lowering of the water level of the oxalic acid aqueous solution to the water level WL3 and the rise of the water level of the oxalic acid aqueous solution to the water level WL2 are repeated.

When the oxalic acid aqueous solution in the RPV 3 is transferred to the buffer tank 101, that is, when the water level of the oxalic acid aqueous solution in the RPV 3 is lowered, the valve 103 is opened and the valve 95A is closed to drive the circulation pump 35. The oxalic acid aqueous solution in the lower plenum of the RPV 3 is guided to the buffer tank 101 through the circulation pipe 33, and the water level of the oxalic acid aqueous solution in the RPV 3 is lowered. By lowering the water level of the oxalic acid aqueous solution to the water level WL3, sludge (sediment) remaining on the upper surface of the bottom plate of the steam dryer 30 is discharged to the drain line 31 through the drain discharge hole formed in the bottom plate at the position of each drain pocket 94A together with the oxalic acid aqueous solution, as in the process of step S12 of Embodiment 1. The oxalic acid aqueous solution containing sludge that has reached the drain line 31 is discharged below the lower end of the steam dryer 30, descends along the inner surface of the skirt, and is guided into the downcomer 27. The oxalic acid aqueous solution containing sludge is further guided to the lower plenum through the downcomer 27, the recirculation system pipe 6, and the jet pump 5. When the water level of the oxalic acid aqueous solution in the RPV 3 is lowered to the water level WL3, the valve 95A is opened and the valve 103 is closed while the circulation pump 35 is being driven.

Further, when the oxalic acid aqueous solution in the buffer tank 101 is transferred to the RPV 3, that is, when the water level of the oxalic acid aqueous solution in the RPV 3 is raised, after the water level of the oxalic acid aqueous solution in the RPV 3 is lowered to the position of the water level WL3, the valve 104 is opened while the circulation pump 35 is being driven. At this time, the valve 90 is closed. The oxalic acid aqueous solution in the buffer tank 101 is sprayed from the head spray nozzle 24 through the pipes 102 and 25 and injected into the RPV 3. Therefore, the water level of the oxalic acid aqueous solution in the RPV 3 rises. By raising the water level of the oxalic acid aqueous solution to the water level WL2, sludge deposited on the upper surface of the bottom plate of the steam dryer 30 soars upward, as in the process of step S9 of Embodiment 1. A part of the oxalic acid aqueous solution discharged from the gas-water separator 29 rises in the region between the hood plate 92 and the rectifying plate 96 and flows into the steam flow path 95. The oxalic acid aqueous solution flowing in the steam flow path 95 containing the sludge that has soared upward rises in the flow path between the hood plate 92 and the rectifying plate 99, and is merged with the oxalic acid aqueous solution sprayed from the head spray nozzle 24 and the oxalic acid aqueous solution fed into the RPV 3 through the main steam nozzle 20 from the circulation pipe 33. The merged oxalic acid aqueous solution contains sludge, descends the annular region formed between the inner surface of the RPV 3 and the cylindrical skirt, and is guided to the downcomer 27. The oxalic acid aqueous solution that has reached the downcomer is guided to the lower plenum through the recirculation system pipe 6 and the jet pump 5.

When the water level of the oxalic acid aqueous solution rises and falls, the valves 79 and 80 are opened, the valve 39 is closed, and the circulation pump 35 is being driven, and thus, the sludge-containing oxalic acid aqueous solution existing in the lower plenum in the RPV 3 is fed to the filter 63 through the circulation pipe 33. The solid content (for example, sludge) contained in the oxalic acid aqueous solution is removed by the filter 63. The oxalic acid aqueous solution from which the solid content has been removed and discharged from the filter 63 is returned to the circulation pipe 33.

The reduction decontamination agent and the pH adjustment agent contained in the reduction decontamination solution are decomposed, and the water after the decomposition of the reduction decontamination agent and the pH adjustment agent is purified (step S11). Similar to step S11 of Embodiment 1, the oxalic acid and hydrazine contained in the oxalic acid aqueous solution are decomposed in the decomposition device 59 by the action of the activated carbon catalyst existing in the decomposition device 59 and the fed hydrogen peroxide. When the oxalic acid concentration in the oxalic acid aqueous solution becomes equal to or less than a predetermined value, the injection of hydrogen peroxide into the decomposition device 59 is stopped. The process of decomposing oxalic acid and hydrazine ends when the injection of hydrogen peroxide is stopped. Further, the cleanup process performed in step S11 of the first Embodiment is performed.

After the process of step S11 is completed, the process of step S13 is performed. If the determination in step 13 is "NO", each process of steps S3, S4, S5A, S6A, S8, S10A, S11, and S13 is repeated. When the determination in step 13 becomes "YES", all the water in the RPV is discharged in the process of step S14. After the process of step S14 is completed, the process of step S15 is performed in the same manner as in Embodiment 1.

This completes the chemical decontamination method of the present Embodiment.

In the present Embodiment, each effect produced in Embodiment 1 can be obtained. Further, in the present Embodiment, the chemical decontamination aqueous solution (oxidation decontamination aqueous solution or reduction decontamination aqueous solution) in the RPV 3 is transferred to the buffer tank 101 to lower the water level of the chemical decontamination aqueous solution in the RPV 3, and the chemical decontamination aqueous solution in the buffer tank 101 is transferred to the RPV 3 to raise the water level of the chemical decontamination aqueous solution the buffer tank 101. Therefore, in each process of the chemical decontamination aqueous solution of steps S5A and S10A in the RPV 3, the chemical decontamination aqueous solution in each of the processes is chemically decontaminated when the water level is lowered and rises. There is no need to drain water from the chemical decontamination device 32 to the outside. Therefore, in the present Embodiment, the chemical decontamination of radioactive waste liquid to be treated is reduced.

Embodiment 3

The chemical decontamination method of Embodiment 3, which is another preferred Embodiment of the present invention, will be described with reference to FIGS. 3, 12, and 14. The chemical decontamination method of the present Embodiment is applied to a BWR plant that is subject to decommissioning.

In the chemical decontamination method of the present Embodiment, instead of the buffer tank 101 used in the chemical decontamination device of Embodiment 2, any one of a fuel storage pool, a boric acid water injection system (SLC) tank, and an equipment temporary storage pool for storing the steam dryer and gas-water separator is used. In the chemical decontamination method of the present Embodiment, for example, a fuel storage pool is used.

When a plurality of fuel assemblies are stored in the fuel storage pool before starting the process of step S1 (connection of the chemical decontamination device to the decontamination target) in the chemical decontamination method of the present Embodiment, those fuel assemblies are transferred to another storage location. For example, if there is another BWR plant that is not subject to decommissioning other than the BWR plant that is subject to decommissioning within the same nuclear power plant, all fuel assemblies in the fuel storage pool of the BWR plant that is subject to decommissioning (hereinafter referred to as a first fuel storage pool) are transferred to the fuel storage pool of another BWR plant that is not subject to decommissioning (hereinafter referred to as the second fuel storage pool).

The outline of this fuel transfer will be explained. A plurality of fuel assemblies in the first fuel storage pool are stored in an empty fuel transfer cask placed in cooling water in the first fuel storage pool, and the fuel transfer cask where a plurality of fuel assemblies are stored and cooling water is present inside is sealed. This fuel transfer cask is transferred from the first fuel storage pool to the cooling water in the second fuel storage pool, the lid of the fuel transfer cask is removed in the cooling water, and the entire fuel assemblies is taken out from the fuel transfer cask and stored in the cooling water in the second fuel storage pool. The fuel assemblies are transferred from the first fuel storage pool to the second fuel pool until the fuel assembly in the first fuel storage pool is absent.

In the chemical decontamination method of the present Embodiment, each process of steps S1 to S4, S5A, S6, S8, S10A, S11, S13, and S14 shown in FIG. 12 performed in Embodiment 2 is performed.

First, the chemical decontamination device is connected to the decontamination target in the state where the fuel assembly does not exist in the reactor core (step S1). Similar to the process of step S1 of Embodiment 2, one end portion of the circulation pipe 33 of the chemical decontamination device 32 is connected to the decontamination solution distribution pipe of the connecting jig attached to each flange of the CRD housing 22 and the ICM housing 23 attached to the bottom of the RPV 3. Further, one end portion of the circulation pipe 33 is also connected to the drain pipe 26 connected to the bottom of the RPV 3. The other end portion of the circulation pipe 33 is connected to the main steam nozzle 20 of the RPV 3.

In the process of step S1, unlike Embodiment 2, one end portion of the pipe 106 connected to a fuel storage pool 105 is connected to the circulation pipe 33 between the on-off valve 34 and the valve 95A provided in the circulation pipe 33 of the chemical decontamination device 32. The valve 95A is provided in the circulation pipe 33 upstream of the valve 89. The other end portion of the pipe 106 is connected to the pipe 25 between the head spray nozzle 24 and the valve 90. The valve 108 is installed in the pipe 106 between the fuel storage pool 105 and the circulation pipe 33, and the valve 100A and the pump 107 are installed in the pipe 106 between the fuel storage pool 105 and the pipe 25. The fuel storage pool 105 is arranged at a position higher than that of the RPV 3.

After the process of step S1 is completed, each process of steps S2 to S4 is performed in the same manner as in Embodiment 1.

Each process of steps S1 to S4 is performed in the same manner as in Embodiment 2.

Oxidation decontamination is performed to raise or lower the water level in the RPV (step S5A). Similar to the process of step S5 of Embodiment 1, when the water level of the permanganic acid aqueous solution at 90° C. in the RPV 3 having a permanganic acid concentration of the second set concentration is at the position above the upper end of the steam dryer 30 (for example, the position of the water level WL2 shown in FIG. 9), the permanganic acid aqueous solution is circulated in the closed loop including the internal region of the RPV 3 and the circulation pipe 33. Since the temporary pump 7A is being driven, the permanganic acid aqueous solution circulates in the downcomer 27, the recirculation system pipe 6, the jet pump 5, the lower plenum, the reactor core shroud 28, and the downcomer 27. Therefore, oxidation decontamination is performed on the inner surface of the RPV 3 and the surface of each reactor internal structure in the RPV 3 that comes into contact with the permanganic acid aqueous solution.

Further, in the process of step S5A, the water level of the permanganic acid aqueous solution in the RPV 3 is raised or lowered to promote oxidation decontamination in the steam dryer 30. When the water level of the permanganic acid aqueous solution is raised or lowered, the circulation of the permanganic acid aqueous solution is stopped in the closed loop including the internal region of the RPV 3 and the circulation pipe 33. However, since the temporary pump 7A is being driven, the permanganic acid aqueous solution is circulated through the recirculation system pipe 6 as described above even when the water level of the permanganic acid aqueous solution is raised or lowered.

Since a valve 108 is opened, the valve 95A is closed, and the circulation pump 35 is driven, the permanganic acid aqueous solution of the lower plenum in the RPV 3 is guided into a fuel storage pool 105 to lower the water level of the permanganic acid aqueous solution in the RPV 3, as in the process of step S5A of Embodiment 2. When the water level of the permanganic acid aqueous solution in the RPV 3 is lowered to the position of the water level WL3 (see FIG. 14) below the lower end of the steam dryer 30, the valve 95A is opened and the valve 108 is closed while the circulation pump 35 is being driven.

By lowering the water level in the RPV 3 to the water level WL3, sludge slightly deposited on the upper surface of the bottom plate of the steam dryer 30 is removed from the upper surface. Similar to the process of step S5A in Embodiment 2, the permanganic acid aqueous solution containing the removed sludge is guided to filter 63. The permanganic acid aqueous solution from which sludge has been removed by the filter 63 is fed to the fuel storage pool.

After the water level of the permanganic acid aqueous solution in the RPV 3 is lowered to the position of the water level WL3, the valve 100A is opened to drive the pump 107 while the circulation pump 35 is being driven. The permanganic acid aqueous solution in the fuel storage pool 105 is guided to the head spray nozzle 24 through the pipes 106 and 25 and sprayed, and the water level of the permanganic acid aqueous solution in the fuel storage pool 105 is lowered and the water level of the permanganic acid aqueous solution in the RPV 3 rises, as in the process of step S5A of Embodiment 2. However, when the permanganic acid aqueous solution in the fuel storage pool 105 is fed into the RPV 3 only by the head pressure, it is not necessary to install the pump 107 in the pipe 106.

When the water level of the above-mentioned permanganic acid aqueous solution is lowered, the sludge that has not been removed from the upper surface of the bottom plate of the steam dryer 30 and remains on the upper surface thereof soars upward from the upper surface. Similar to the process of step S5A in Embodiment 2, the permanganic acid aqueous solution containing the sludge that has soared upward flows through the steam flow path 95 to be merged with the oxalic acid aqueous solution fed from the main steam nozzle 20 into the RPV 3, and descends in the annular region formed between the inner surface of the RPV 3 and the cylindrical skirt to reach the downcomer 27. Then, the permanganic acid aqueous solution containing the sludge is guided to the filter 63, and the sludge is removed by the filter 63. While the permanganic acid aqueous solution in the fuel storage pool 105 is being fed into the RPV 3, the permanganic acid aqueous solution from which sludge has been removed is guided into the RPV 3 from the main steam nozzle 20 through the circulation pipe 33 in which the valve 95A is opened, and descends in the annular region formed between the inner surface of the RPV 3 and the skirt to reach the downcomer 27.

When the water level of the permanganic acid aqueous solution in the RPV 3 rises, the permanganic acid aqueous solution circulates in the closed loop including the internal region of the RPV 3 and the circulation pipe 33. When the water level of the permanganic acid aqueous solution rises to the water level WL2 shown in FIG. 9, the valve 100A is closed and the feed of the permanganic acid aqueous solution from the fuel storage pool 105 to the RPV 3 is stopped. In step S5A of the present Embodiment, the water level of the permanganic acid aqueous solution is repeatedly lowered and raised between the water level WL2 and the water level WL3.

While the process of step S5A is being performed, the permanganic acid in the permanganic acid aqueous solution is maintained at the second set concentration. In the process of step S5A, the circulation of the permanganic acid aqueous solution in the above-mentioned closed loop in a state where the water level of the permanganic acid aqueous solution is held at the water level WL2 in the RPV 3, the lowering of the water level of the permanganic acid aqueous solution in the RPV 3 from the water level WL2 to the water level WL3, and the rise of the water level of the permanganic acid aqueous solution in the RPV 3 from the water level WL3 to the water level WL2 are repeated, thereby performing oxidation decontamination.

The oxidation decontamination agent contained in the oxidation decontamination solution is decomposed (step S6A). With the water level of the permanganic acid aqueous solution in the RPV 3 at the water level WL2 shown in FIG. 9, the valve 95A is opened to drive the circulation pump 35. The valve 89 is opened and the valve 90 is closed. By driving the circulation pump 35, the permanganic acid aqueous solution in the RPV 3 is circulated in the closed loop including the internal region of the RPV 3 and the circulation pipe 33. After the oxidation decontamination is completed in the same manner as in the process of step S6 of Embodiment 1, the oxalic acid aqueous solution (decomposition agent aqueous solution) in the surge tank 53 is fed to the circulation pipe 33 and the RPV 3 in the same manner as in the process of step S6A of Embodiment 2. The oxalic acid (decomposition agent) contained in the fed oxalic acid aqueous solution decomposes the permanganic acid contained in the permanganic acid aqueous solution, and the permanganic acid aqueous solution becomes colorless and transparent. When the permanganic acid aqueous solution becomes colorless and transparent, the decomposition of the permanganic acid contained in the permanganic acid aqueous solution is completed.

In the process of step S6A, the cleanup process performed in step S6 of Embodiment 1 is not performed. This cleanup process is performed only in the process of step S11 described later, as in Embodiment 2.

A reduction decontamination agent is injected (step S8). Unlike the process of step S8 in Embodiment 1, the water level of the permanganic acid aqueous solution in the RPV 3 is the water level WL2 shown in FIG. 9 at the start of injection of the reduction decontamination agent in the present Embodiment. Similar to Embodiment 1, since oxalic acid and hydrazine are injected, the oxalic acid aqueous solution having an oxalic acid concentration of the fourth set concentration at a pH of 2.5 and 90° C. is circulated in the closed loop including the internal region of the RPV 3 and the circulation pipe 33. Since the temporary pump 7A is being driven, the oxalic acid aqueous solution in the RPV 3 is agitated, and the oxalic acid concentration of the oxalic acid aqueous solution becomes uniform.

Reduction decontamination is performed to raise or lower the water level in the RPV (step S10A). Similar to the process of step S10 of Embodiment 1, in the state where the water level of the oxalic acid aqueous solution is at a position above the upper end of the steam dryer 30 (for example, the position of the water level WL2 shown in FIG. 9) in the RPV 3, the oxalic acid aqueous solution is circulated in a closed loop including the internal region of the RPV 3 and the circulation pipe 33. The oxalic acid aqueous solution has an oxalic acid concentration of the fourth set concentration, a temperature of 90° C., and a pH of 2.5. Since the temporary pump 7A is being driven, the oxalic acid aqueous solution is circulated through the recirculation system pipe 6 as described above. By such a flow of the oxalic acid aqueous solution, reduction decontamination is performed on the inner surface of the RPV 3 and the surface of each reactor internal structure in the RPV 3 including the steam dryer 30, which are in contact with the oxalic acid aqueous solution. Therefore, the oxide film containing the radionuclides formed on the inner surface of the RPV 3 and the surface of each reactor internal structures in the RPV 3 in contact with the oxalic acid aqueous solution is dissolved and removed.

By dissolving the oxide film, metal cations such as the radionuclides and Fe contained in the oxalic acid aqueous solution are adsorbed on the cation exchange resin in the cation exchange resin tower 64 and removed.

Further, in the process of step S10A, the water level of the oxalic acid aqueous solution in the RPV 3 is raised or lowered to promote the reduction decontamination in the steam dryer 30 similar to the process of step 5A. When the water level of the oxalic acid aqueous solution is raised or lowered, the circulation of the oxalic acid aqueous solution is stopped in the closed loop including the internal region of the RPV 3 and the circulation pipe 33. However, since the temporary pump 7A is being driven, the oxalic acid aqueous solution is circulated through the recirculation system pipe 6 as described above even when the water level of the oxalic acid aqueous solution is raised or lowered. When the water level of the oxalic acid aqueous solution is raised or lowered, the valve 108 is opened, the valve 95A is closed, and valves 90 and 104 are closed.

Since the valve 108 is opened, the valve 95A is closed, and the circulation pump 35 is being driven, the oxalic acid aqueous solution of the lower plenum in the RPV 3 is guided into the fuel storage pool 105, and the water level of the oxalic acid aqueous solution in the RPV 3 is lowered. When the water level of the oxalic acid aqueous solution in the RPV 3 is lowered to the position of the water level WL3 (see FIG. 14) below the lower end of the steam dryer 30, the valve 95A is opened and the valve 108 is closed while the circulation pump 35 is being driven. By lowering the water level of the oxalic acid aqueous solution to the water level WL3, sludge (sediment) remaining on the upper surface of the bottom plate of the steam dryer 30 is discharged to the drain line 31 through the drain discharge hole formed in the bottom plate at the position of each drain pocket 94A, together with the oxalic acid aqueous solution as in the process of step S12 of Embodiment 1. The oxalic acid aqueous solution containing sludge that has reached the drain line 31 is guided into the downcomer 27. The oxalic acid aqueous solution containing sludge is further guided to the lower plenum through the downcomer 27, the recirculation system pipe 6, and the jet pump 5.

Further, when the oxalic acid aqueous solution in the fuel storage pool 105 is transferred to RPV 3, the valve 108 is closed, the valves 95A and 100A are opened, and the circulation pump 35 is driven. The valve 90 is closed. The oxalic acid aqueous solution in the fuel storage pool 105 is injected into the RPV 3 from the head spray nozzle 24 through the pipes 106 and 25. Therefore, the water level of the oxalic acid aqueous solution in the RPV 3 rises. When the water level of the oxalic acid aqueous solution is raised to the water level WL2, the sludge deposited on the upper surface of the bottom plate of the steam dryer 30 soars upward. Similar to the process of step S10A of Embodiment 2, the oxalic acid aqueous solution containing the sludge that has soared upward flows through the steam flow path 95 and merges with the oxalic acid aqueous solution fed from the main steam nozzle 20 into the RPV 3, and descends in the annular region formed between the inner surface of the RPV 3 and the cylindrical skirt, and is guided to the lower plenum via the downcomer 27.

When the water level of the oxalic acid aqueous solution rises and falls, the valves 79 and 80 are opened, the valves 39 are closed, and the circulation pump 35 is driven, and thus, the oxalic acid aqueous solution containing the sludge existing in the lower plenum in the RPV 3 is fed to the filter 63 through the circulation pipe 33. The solid content (for example, sludge) contained in the oxalic acid aqueous solution is removed by the filter 63.

The reduction decontamination agent and the pH adjustment agent contained in the reduction decontamination solution are decomposed, and the water after the decomposition of the reduction decontamination agent and the pH adjustment agent is purified (step S11). Similar to step S11 of Embodiment 1, the oxalic acid and hydrazine contained in the oxalic acid aqueous solution are decomposed in the decomposition device 59 by the action of the activated carbon catalyst existing in the decomposition device 59 and the fed hydrogen peroxide. When the oxalic acid concentration of the oxalic acid aqueous solution becomes equal to or less than a predetermined value, the injection of hydrogen peroxide into the decomposition device 59 is stopped. The process of decomposing oxalic acid and hydrazine ends when the injection of hydrogen peroxide is stopped. Further, the cleanup process performed in step S11 of Embodiment 1 is performed.

After the process of step S11 is completed, the process of step S13 is performed. If the determination in step 13 is "NO", each process of steps S3, S4, S5A, S6A, S8, S10A, S11, and S13 is repeated. When the determination in step 13 becomes "YES", the chemical decontamination device 32 is removed from the RPV 3 in the process of step S14.

This completes the chemical decontamination method of the present Embodiment.

In the present Embodiment, each effect produced in Embodiment 2 can be obtained. Further, in the present Embodiment, since the fuel storage pool 105 provided in the BWR plant 1 is used to store the chemical decontamination aqueous solution transferred from the RPV 3 when the water level of the chemical decontamination aqueous solution (oxidation decontamination aqueous solution and reduction decontamination aqueous solution) in the RPV 3 was lowered, it does not need to be newly installed as in the buffer tank 101 of Embodiment 2.

REFERENCE SIGNS LIST

1 . . . boiling water reactor plant, 3 . . . reactor pressure vessel, 4 . . . reactor core, 6 . . . recirculation system pipe, 9 . . . turbine, 11 . . . feed water pipe, 24 . . . head spray nozzle, 27 . . . downcomer, 28 . . . reactor core shroud, 29 . . . gas-water separator, 30 . . . steam dryer, 31 . . . drain line, 32 . . . chemical decontamination device, 33 . . . circulation pipe, 35 . . . circulation pump, 43 . . . pH adjustment agent injection device, 48 . . . oxidation decontamination agent injection device, 54 . . . oxidant injection device, 59 . . . decomposition device, 63 . . . filter, 64 . . . cation exchange resin tower, 65 . . . mixed bed resin tower, 91 . . . steam dryer element, 93 . . . corrugated plate, 94 . . . droplet collection Plate, 94A . . . drain pocket, 95 . . . steam flow path, 96, 99 . . . rectifying plate, 101 . . . buffer tank, 105 . . . fuel storage pool.

What is claimed is:

1. A chemical decontamination method comprising:
feeding a chemical decontamination aqueous solution into a reactor pressure vessel in which a steam dryer is arranged, and
after chemical decontamination of the steam dryer, a water level of the chemical decontamination aqueous solution existing in the reactor pressure vessel is lowered to a first water level below a lower end of the steam dryer.

2. The chemical decontamination method according to claim 1, wherein
the chemical decontamination of the steam dryer is performed by raising the water level of the chemical decontamination aqueous solution in the reactor pressure vessel to a second water level above an upper end of the steam dryer, and
then the water level of the chemical decontamination aqueous solution is lowered from the second water level to the first water level.

3. The chemical decontamination method according to claim 2, wherein
the first water level is a water level in a range below the lower end of the steam dryer and above a shroud head attached to an upper end of a cylindrical reactor core shroud arranged in the reactor pressure vessel.

4. The chemical decontamination method according to claim 2, wherein
the second water level is located above the upper end of the steam dryer, and is a water level within a range at or below a position of a lower surface of a pressing member that is attached to an upper lid that seals the reactor pressure vessel and presses the steam dryer in an axial direction of the reactor pressure vessel.

5. The chemical decontamination method according to claim 3, wherein
the lowering of the water level of the chemical decontamination aqueous solution in the reactor pressure vessel to the first water level is implemented by discharging the chemical decontamination aqueous solution in the reactor pressure vessel to an outside of the reactor pressure vessel, and
the chemical decontamination aqueous solution discharged to the outside of the reactor pressure vessel is fed to a solid content removing device.

6. The chemical decontamination method according to claim 4, wherein
the raising of the water level of the chemical decontamination aqueous solution in the reactor pressure vessel to the second water level is implemented by feeding demineralized water into the reactor pressure vessel.

7. The chemical decontamination method according to claim 2, wherein
the lowering of the water level of the chemical decontamination aqueous solution in the reactor pressure vessel to the first water level is performed by guiding the chemical decontamination aqueous solution in the reactor pressure vessel to a buffer tank located at a position higher than that of the reactor pressure vessel, and
the rise of the water level of the chemical decontamination aqueous solution in the reactor pressure vessel to the second water level is performed by guiding the chemical decontamination aqueous solution in the buffer tank to the reactor pressure vessel.

8. The chemical decontamination method according to claim 2, wherein
the lowering of the water level of the chemical decontamination aqueous solution in the reactor pressure vessel to the first water level is performed by guiding the chemical decontamination aqueous solution in the reactor pressure vessel to any of a fuel storage pool, a boric acid water injection system tank, and an equipment temporary storage pool, which are arranged at a position higher than that of the reactor pressure vessel, and the raising of the water level of the chemical decontamination aqueous solution in the reactor pressure vessel to the second water level is performed by guiding the chemical decontamination aqueous solution to the reactor pressure vessel from any of the fuel storage pool, the boric acid water injection system tank, and the equipment temporary storage pool.

9. The chemical decontamination method according to claim 1, wherein the injection of a chemical decontamination agent into the reactor pressure vessel is performed in a state where the water level in the reactor pressure vessel is located below the lower end of the steam dryer.

10. The chemical decontamination method according to claim 1, wherein after chemical decontamination using the chemical decontamination aqueous solution is performed on one or more surfaces of a plurality of reactor internal structures including the steam dryer in the reactor pressure vessel, which are in contact with the chemical decontamination aqueous solution, a chemical decontamination agent contained in the chemical decontamination aqueous solution is decomposed.

11. The chemical decontamination method according to claim 1, wherein a first end portion of a circulation pipe of a chemical decontamination device is connected to a lower plenum formed below a reactor core in the reactor pressure vessel, and a second end portion of the circulation pipe is connected to a main steam nozzle provided in the reactor pressure vessel, and the chemical decontamination aqueous solution is circulated in a closed loop including an internal region in the reactor pressure vessel and the circulation pipe.

12. The chemical decontamination method according to claim 11, wherein a part of the chemical decontamination aqueous solution flowing in the circulation pipe is guided to a head spray nozzle through a pipe connecting the head spray nozzle provided at a top of the reactor pressure vessel and the circulation pipe above the steam dryer to be sprayed toward the steam dryer in the reactor pressure vessel.

13. The chemical decontamination method according to claim 1, wherein in the reactor pressure vessel, a cylindrical reactor core shroud is arranged, and a plurality of jet pumps are arranged in a downcomer formed between an outer surface of the reactor core shroud and an inner surface of the reactor pressure vessel, a recirculation system pipe in which a first end portion is connected to the downcomer and a second end portion is connected to a nozzle of one of the plurality of jet pumps, and either a recirculation pump or a temporary pump is installed in the recirculation system pipe, and when the chemical decontamination agent is fed into the reactor pressure vessel, the pump installed in the recirculation system pipe among the recirculation pump and the temporary pump is driven to circulate the chemical decontamination aqueous solution in the reactor pressure vessel through the recirculation system pipe, the jet pump, the reactor core shroud, and the downcomer.

14. The chemical decontamination method according to claim 1, wherein the chemical decontamination method includes oxidation decontamination using an oxidation decontamination aqueous solution as the chemical decontamination aqueous solution and reduction decontamination using a reduction decontamination aqueous solution as the chemical decontamination aqueous solution.

* * * * *